(12) United States Patent
Martin et al.

(10) Patent No.: US 7,174,512 B2
(45) Date of Patent: Feb. 6, 2007

(54) PORTAL FOR A COMMUNICATIONS SYSTEM

(75) Inventors: Christy R. Martin, Santa Cruz, CA (US); Bernard Agasse, Eragny/oise (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 516 days.

(21) Appl. No.: 09/995,481

(22) Filed: Nov. 28, 2001

(65) Prior Publication Data

US 2002/0067376 A1 Jun. 6, 2002

Related U.S. Application Data

(60) Provisional application No. 60/250,350, filed on Dec. 1, 2000.

(51) Int. Cl.
*G11B 27/00* (2006.01)
*G06F 3/00* (2006.01)

(52) U.S. Cl. .................. 715/719; 715/781; 725/44; 725/39

(58) Field of Classification Search ............... 345/810, 345/825, 832, 812; 725/37, 39, 40, 41, 44, 725/45, 50, 26; 715/719, 781
See application file for complete search history.

(56) References Cited

U.S. PATENT DOCUMENTS

| | | | | |
|---|---|---|---|---|
| 5,559,548 A | * | 9/1996 | Davis et al. | 725/40 |
| 5,949,955 A | * | 9/1999 | Nakai | 386/106 |
| 6,052,145 A | * | 4/2000 | Macrae et al. | 725/50 |
| 6,239,794 B1 | * | 5/2001 | Yuen et al. | 725/41 |
| 6,268,849 B1 | * | 7/2001 | Boyer et al. | 725/40 |
| 6,522,342 B1 | * | 2/2003 | Gagnon et al. | 345/716 |
| 6,557,007 B1 | * | 4/2003 | Pekowski et al. | 707/104.1 |
| 6,859,907 B1 | * | 2/2005 | McGarry | 715/503 |
| 2001/0056485 A1 | * | 12/2001 | Barrett et al | 709/224 |
| 2002/0005866 A1 | * | 1/2002 | Gorham et al. | 345/760 |

* cited by examiner

*Primary Examiner*—Kieu D. Vu
*Assistant Examiner*—Ting Zhou
(74) *Attorney, Agent, or Firm*—Osha Liang LLP

(57) ABSTRACT

A portal for a communications system that includes a remote terminal connected via a communications network to a broadcast center. The portal includes a display connected to the remote terminal for displaying an arrangement of cells, each cell including a visual object and an underlying application. A user input device enables user inputs to select one of the cells. The portal provides simple and intuitive access to the wide variety of services currently offered, and to be offered in the future, in communications systems.

3 Claims, 24 Drawing Sheets

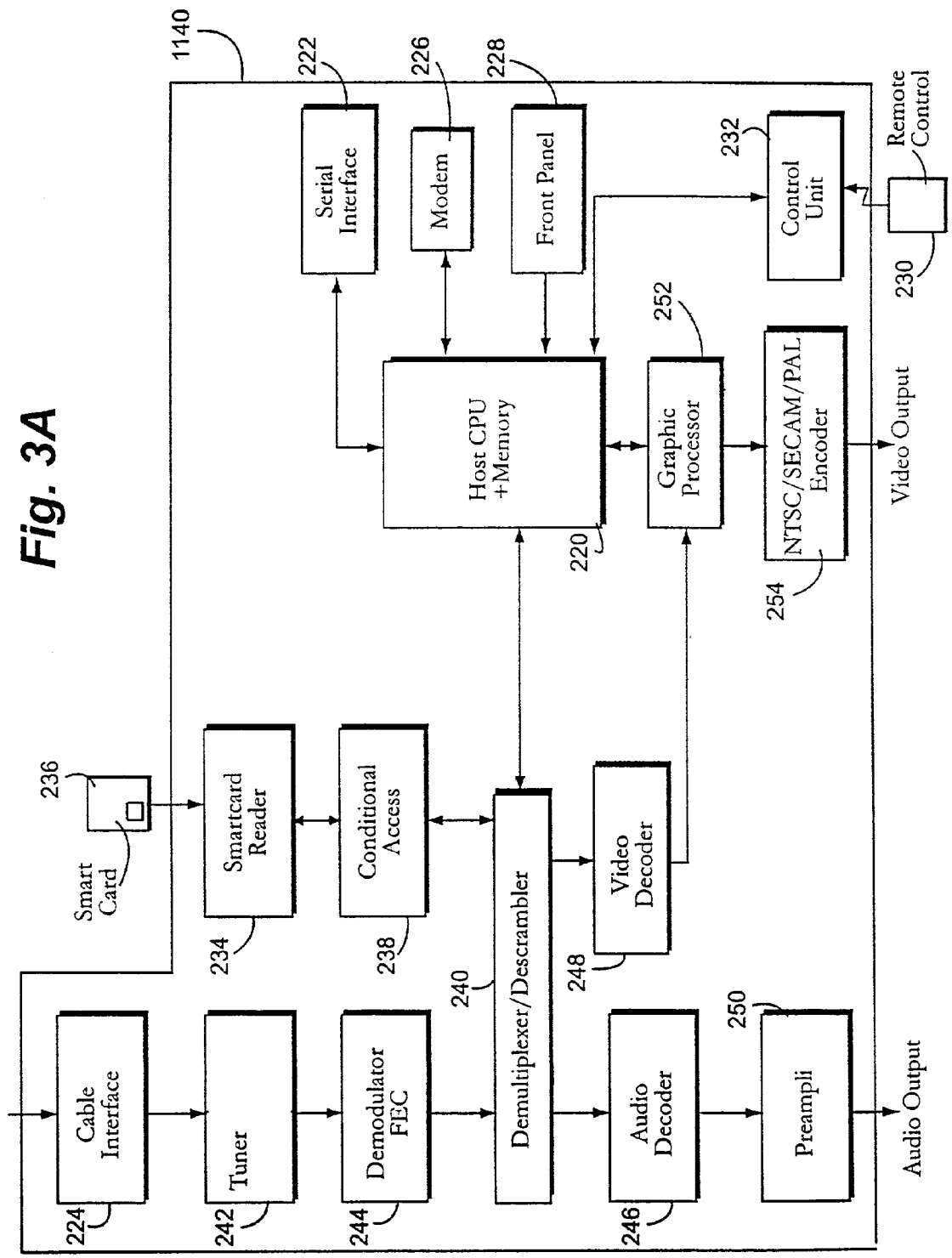

Application Portal

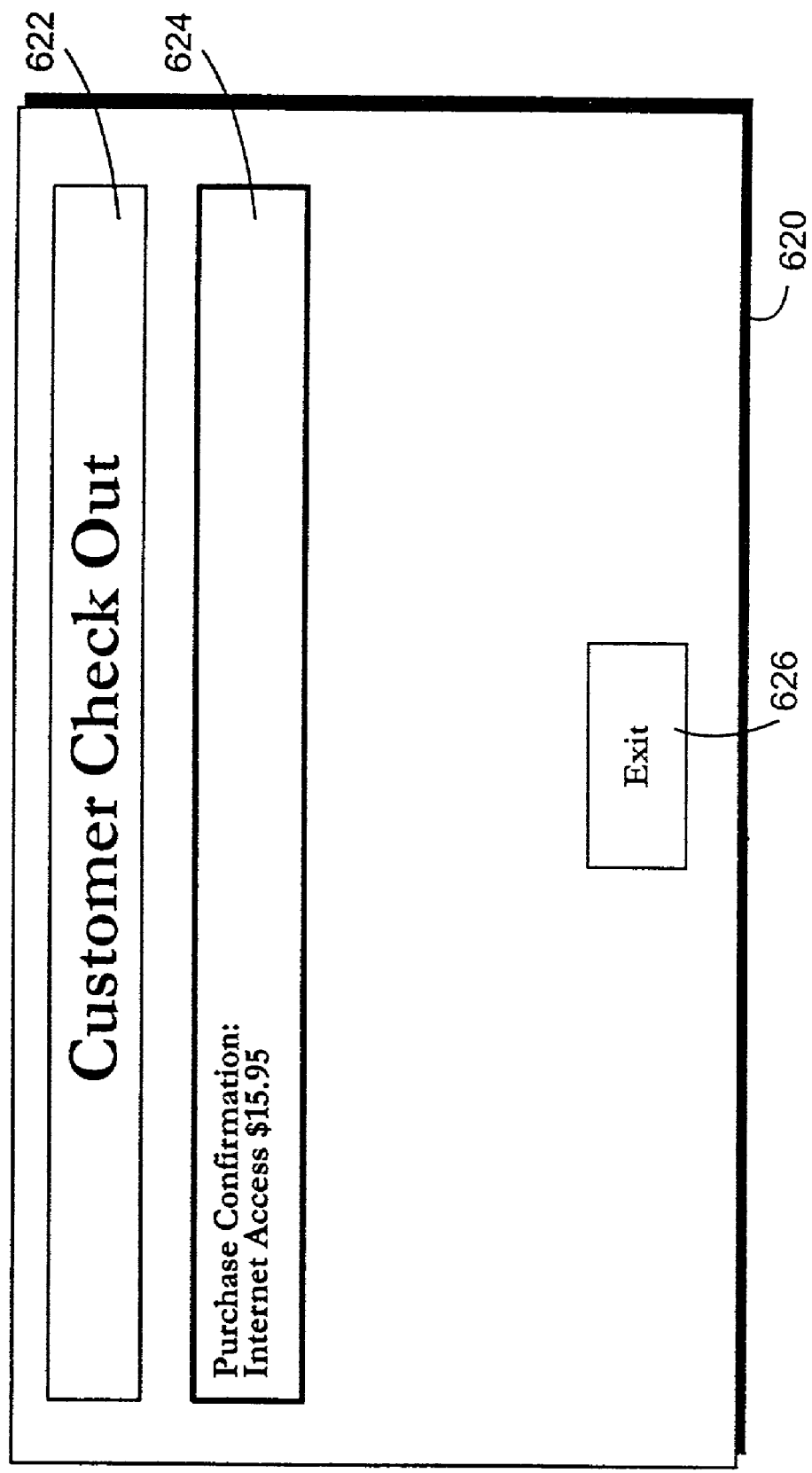

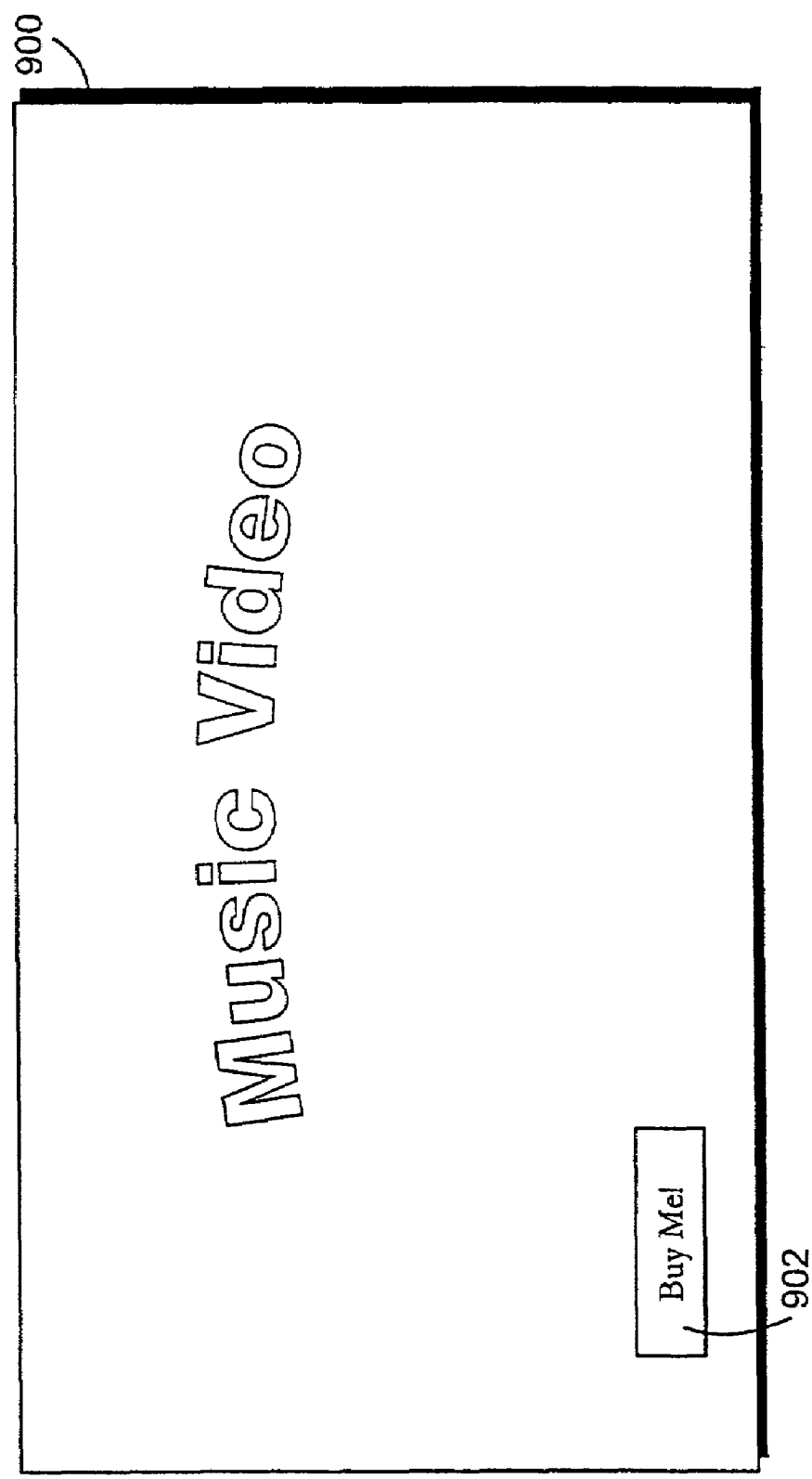

PORTAL FOR A COMMUNICATIONS SYSTEM

CROSS-REFERENCE TO RELATED APPLICATIONS

This patent application is related by subject matter to PCT/IB99/01356, entitled "Navigation System for a Multichannel Digital Television Signal", and to PCT/IB99/01350, entitled "Navigation System for a Multichannel Digital Television Signal". The entire contents of these documents are incorporated herein by reference. This application claims the benefit of U.S. Provisional Patent Application No. 60/250,350 filed Dec. 1, 2000.

FIELD OF THE INVENTION

The present invention generally relates to a communications system and, more particularly, to a portal that provides simple and intuitive access to the wide variety of services currently offered, and to be offered in the future, in communications systems such as digital television systems.

BACKGROUND OF THE INVENTION

As the bandwidth of communication systems increases, more and more information can be communicated to users that are connected in and to these systems. While the ability to communicate more information offers many opportunities, it becomes more difficult to provide users with meaningful access to the information. Thus, increased bandwidth makes data presentation especially important.

For example, one of the advantages of digital television lies in the number of channels that are available in such systems and the flexibility that is available to the television service provider regarding what channel choices may be made available to a subscriber of the service. Other than a standard set of subscription channels, the system may also include other access-controlled channels such as, for example, pay-per-view channels that enable a subscriber to pay for a particular film, sporting event, etc. In addition, the digital television system may allow the user to access a number of other interactive services, such as a text-based program guides, weather maps, mosaic displays of available channels, etc. These services may be associated with dedicated digital television channels used to carry the information. While text-based program guides and mosaic displays of available channels can simplify the tuning of desired programs, there remains a need to provide an interface that provides simple and intuitive access to the wide variety of services currently offered, and to be offered in the future, in communications systems.

SUMMARY OF THE INVENTION

The systems and methods described herein relate to a portal for simultaneously viewing video channels, launching interactive applications, and/or interfacing with locally or remotely stored content. The portal is the user's "home base" from which he/she can navigate to the different features within the system. The portal is based on a mosaic containing a configurable number of cells and pages. The background of the portal may have branding information, as well as internet-style click-through advertising that allows the user to click for more information or to make an online purchase. There is also space to display regional information such as local weather data.

Each cell within the mosaic is represented by a visual object such as live video, a graphic still, animation, or text. As the user moves a highlight between cells, the associated audio, if any, is played and a short description of the application or video content is displayed on the screen. The visual object may also change when a cell is highlighted. For example, a graphic still may become animated, or a still video frame may become live video. When a cell is selected, the application or video channel is launched full screen.

In one example, a portal is provided for a communications system that includes a remote terminal connected via a communications network to a broadcast center. The portal includes a display connected to the remote terminal for displaying an arrangement of cells, each cell including a visual object and an underlying application. A user input device enables a user to select one of the cells. When a cell is selected, the underlying application is launched full screen.

In another example, a portal for a communications system is generated by receiving a plurality of programs, continuously monitoring data indicative of characteristics of the received programs and generating a portal including cells containing current video of at least some of the received programs, the cells being organized based on the characteristics of the received programs. The cells are dynamically re-organized when the monitored characteristics of one or more of the received programs change.

These and many other advantages of the present invention will be more completely understood and appreciated by careful study of the following more detailed description of illustrative embodiments of the invention taken in conjunction with the accompanying drawings.

BRIEF DESCRIPTION OF THE DRAWINGS

FIG. 3A is a block diagram of the elements making up example STB 1140.

FIGS. 6A and 6B show an example of a click-through advertising application.

FIGS. 9A–C show an example CD purchase application.

DETAILED DESCRIPTION OF EXAMPLE EMBODIMENTS

Figure 1A:
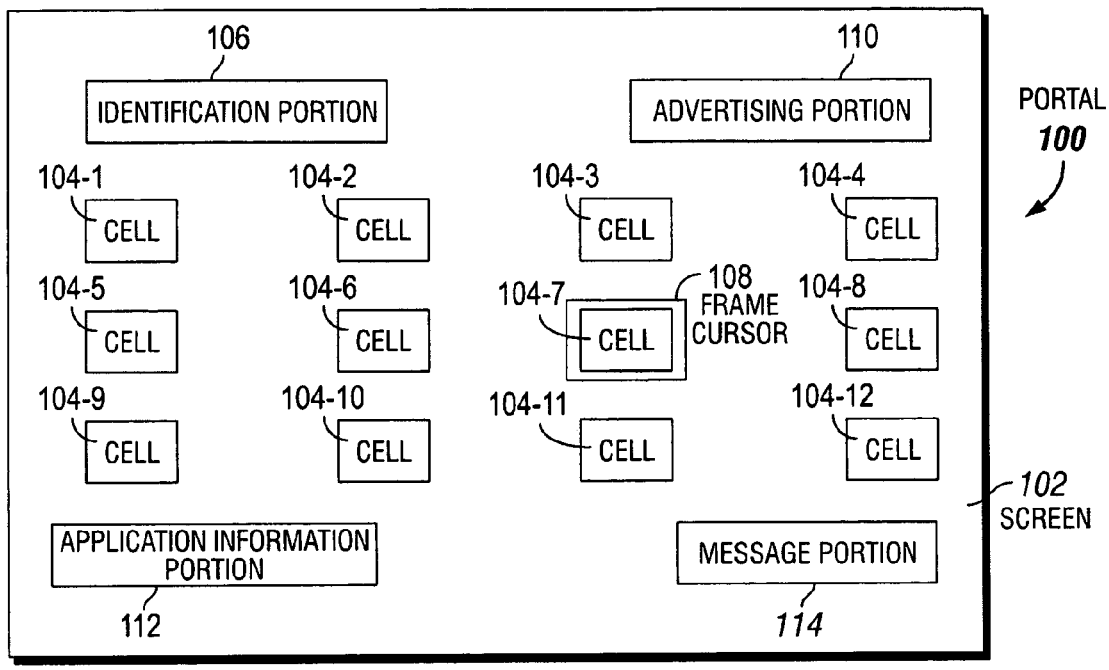
FIGS. 1A and 1B show example portals in accordance with the present invention.

FIG. 1A shows an example portal 100. Portal 100 is displayed on a display such as a television. Example portal 100 provides access to various services offered in a television system (e.g., a digital television system) and comprises "cells" 104-1 to 104-12 arranged in a row and column matrix on a television screen 102. In the example portal, the twelve cells are arranged in a 3-row by 4-column matrix. Of course, the invention is not limited to any particular number of cells or even to a row and column arrangement. Additionally, there is no requirement that each cell be of the same size. Each cell 104 has associated therewith a visual object and an underlying application. The visual object preferably provides a readily recognizable representation of the underlying application and may, by way of example, be in the form of live video from a television channel, a video loop (e.g., a preview from an upcoming television show or movie), a still video image, a graphic, text or some combination of these. Graphics, text or still video images may, if desired, be included with the application code for the portal. This application code can be stored locally or downloaded upon command.

Other example portals that have access to a local storage device (such as a hard disk) can display video clips stored locally on the storage device to permit management of certain Personal Video Recorder (PVR) functions. PVRs including a hard disk are available from ReplayTV, Inc. of Mountain View, Calif. or TiVo, Inc. of Alviso, Calif. For example, if a PVR is used to record programs, the portal can be configured to play back clips from the recorded programs. The manner in which the clips are played back may be limited by the hardware in the terminal (e.g., set-top box—"STB") running the portal. (The STB itself may be provided with a hard disk to implement PVR functions.) For example, the number of clips that can be simultaneously played back is limited by the capabilities of the available decompression hardware. This typically limits simultaneous playback to one or two clips. To overcome this limitation, one or more of the cells can display still frames for the recorded content. When a cell is selected (gains focus), the recorded program associated with the selected cell can be played back within the cell. When the currently selected cell is deselected (e.g., focus is gained by another cell), the playback of the recorded program within the now-deselected cell is stopped. Thus, a portal may provide access into stored PVR content. In addition, the terminal may be configured to cache still frames of the N most-recently viewed channels locally on the box and display them in cells in the portal.

Using an input device (such as directional keys on a remote control or on a keypad of an STB), a user can position an indicator (e.g., a cursor, a highlight, a frame, etc.) to select one of cells 104. As cells gain/lose focus, the audio output by the television speaker(s) changes and the application or program description text is changed to correspond to the cell currently having focus. Pressing an "OK" or "Enter" key of the input device when the indicator is associated with a particular one of the cells launches the application underlying that cell. For example, one or more of the cells 104-1 to 104-12 may have visual objects that are the live (current) video of respectively corresponding television channels. The application underlying the cells may be a tuning application that will display the television channel in a full-screen view. Other cells may be associated with applications for pay-per-view, video-on-demand, interactive sports, interactive sports statistics, interactive talk shows, games, purchases, stock-ticker information, audio, and the like.

The application that provides portal 100 generates a movable frame cursor shown at 108. This cursor may be moved horizontally and vertically using directional keys of a remote control. Using a suitably configured input device, the cursor could also be moved diagonally. In portal 100 of FIG. 1A, cursor 108 has been moved to select the cell positioned in the second row and third column. Pressing an "OK" or "Enter" key of the remote control causes execution of the application underlying the cell in the second row and third column.

Portal 100 also includes a system operator identification portion 106; an advertising portion 110; an application information portion 112; and a message portion 114. System operator identification portion 106 provides system operator identification data that may, for example, be textual and/or graphical in nature. Advertising portion 110 may be used to display product/service advertising and again may, for example, be textual and/or graphical in nature. The advertising may be directed to all users, to a certain group of users, or to a particular user. Advertising portion 110 may be "selectable" using frame cursor 108 (or a predetermined key on a suitably configured remote control) and the selection of the advertising portion may launch an application for providing additional information to the user regarding the advertised product/service or regarding the company advertising the product/service. Alternatively or additionally, the launched application may initiate a buy sequence so that the user can buy the advertised product/service.

Application information portion 112 displays information regarding the cell on which the user has positioned frame cursor 108. Typically (although certainly not always), this information is textual in nature. For example, when frame cursor 108 is positioned on a cell associated with a television channel, application information portion 112 may display the network name, the program name of the program currently showing on that channel, the program start/end times, and/or other similar information. When frame cursor 108 is positioned on a cell associated with a pay-per-view program, application information portion 112 may display information or prompts regarding the pay-per-view program.

The system operator may use message portion 114 to display messages to users. For example, message portion 114 may display weather information (e.g., current weather conditions, forecasts, weather alerts, etc.). Like advertising portion 110, message portion 114 may be selectable using frame cursor 108 or a predetermined key on a suitably configured remote control. If message portion 114 is used for weather information, an underlying application may be launched to obtain even more detailed weather information (weather maps, extended forecasts, weather in other cities, etc.). In other implementations, message portion 114 may contain sports scores (e.g., baseball, football, basketball) or news headlines. Again, upon selection, an underlying application may be launched so that the user can obtain more detailed sports or news information.

Portal 100 enables a variety of different applications (e.g., tuning to television channels, initiating pay-per-view purchases, product/service purchases, etc.) to be launched from the same screen and therefore provides simple and intuitive access to the wide variety of services offered by the system operator. Audio is changed to correspond to selected cells as users select/deselect cells. The system also supports multiple pages in which cells can be grouped (by theme or genre, for example) into "zones" (e.g., certain rows, columns, or entire pages). Zones may be sponsored by particular advertisers. Thus, for example, a music television "zone" may be sponsored by a record company. This creates new marketing opportunities for the system operator.

Figure 1B:
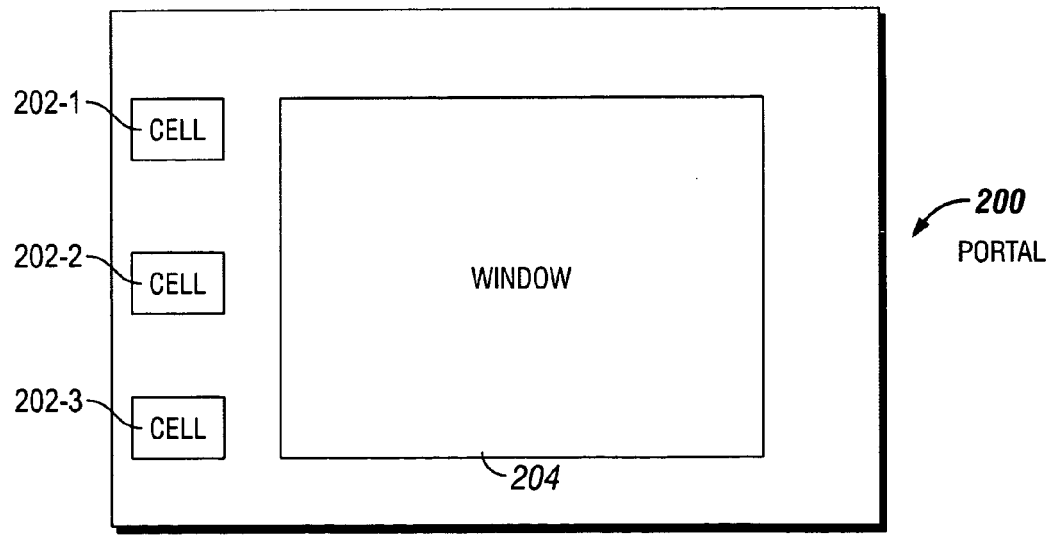

Another example portal 200 is shown in FIG. 1B. In portal 200, three application cells 202-1 to 202-3 are arranged along the left-hand side of television screen 102 and video is displayed in a viewing window 204. The video in window 204 is typically video from a particular television channel, although other video (e.g., from a PVR, a DVD player, or a VCR) may of course be used. Here again, the particular positioning of the cells and the viewing window, and the particular number of cells, should not be construed as a limitation on the scope of the present invention. One or more of cells 202-1 to 202-3 may be dynamic in the sense that they may change while the user watches the video displayed in window 204. One or more of cells 202-1 to 202-3 may also be context-sensitive in the sense that they may be related to content of the video displayed in window 204. Thus, for example, one of the cells may be associated with an application that allows a user to purchase a product/service that is being advertised in an advertisement currently showing in window 204. This cell may be changed when a different product/service is advertised in program window 204. In another example, one of the cells may be associated with an application that allows a user to purchase a compact disk containing a song being played by an artist currently showing in window 204. In another example, one of the cells may be associated with an application that allows a user to purchase a book of an author appearing on a talk show currently showing in window 204. In still another example, one of the cells may be associated with an application that sets a program timer for an upcoming program currently being previewed or promoted in window 204. It may be desirable in at least some instances to display a particular cell for some time period (e.g., thirty seconds, one minute) after the conclusion of the display of the related content in window 204.

As explained in greater detail below, the portals of FIGS. 1A and 1B may be generated remotely at a headend (broadcast center), locally at a user STB, or partly at a headend and partly at a user STB.

Figure 2:
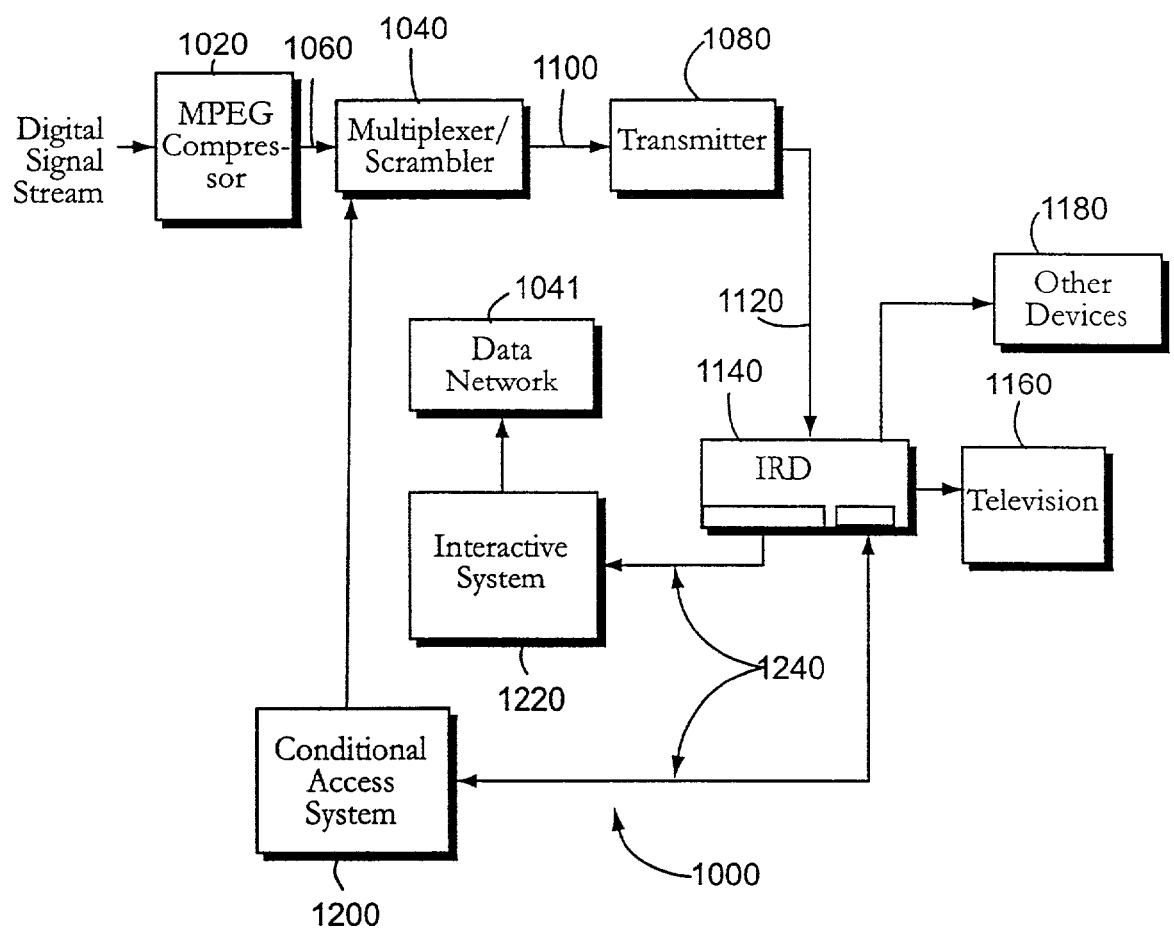
FIG. 2 provides a generalized overview of an example digital television system 1000 in which the portals shown in FIGS. 1A and 1B may be implemented.

FIG. 2 provides a generalized overview of an example digital television system 1000 in which the portals shown in FIGS. 1A and 1B may be implemented. Digital television system 1000 uses known compression techniques (e.g., MPEG-2) to transmit compressed digital signals. In FIG. 2, MPEG compressor 1020 is located in a headend (broadcast center) and receives a digital signal stream. The digital signal stream may be, for example, a stream of video (and any corresponding audio) signals, audio signals (e.g., for music), and data signals (e.g., control data, user data, etc.). The output of MPEG compressor 1020 is supplied to a multiplexer/scrambler 1040 via a signal path 1060. Multiplexer 1040 assembles the transport stream and sends compressed digital signals to a transmitter 1080 of the headend via a signal path 1100, which can of course take a wide variety of forms including telecommunications links. Transmitter 1080 transmits the digital signals over a communication link 1120 to a plurality of STBs 1140, one of which is shown in FIG. 2. Communication link 1120 may be a satellite link in which the digital signals are transmitted via uplink towards a satellite transponder, where they are electronically processed and broadcast via a downlink to an earth receiver, conventionally in the form of a dish owned or rented by the end user. In other systems, the compressed digital signals are transmitted over a wired communication system such as a hybrid fiber coax system. Other transport paths for transmission of the data are of course possible, such as terrestrial broadcast, cable transmission, combined satellite/cable links, telephone networks, fiber optic links, etc. STB 1140 is typically owned or rented by the user and is connected to the end user's television 1160. STB 1140 decodes the compressed signals into, among other things, television signals for display on television 1160. The decoded compressed signals may also be provided to other devices generally indicated in FIG. 2 with reference numeral 1180. These other devices may, for example, include audio equipment for outputting music, VCRs, PVRs, and computer equipment.

In a multichannel system, multiplexer 1040 handles audio and video data received from a number of parallel sources and interacts with transmitter 1080 to broadcast the information along a number of channels. In addition to audio and video data, messages, applications (software programs), CD-quality audio data or any other type of digital data may be introduced into some or all of these channels intermixed with the transmitted digital audio and video data. For a particular transport stream to be received by STB 1140, the relevant program identifier (PID) is determined, and then packets having a matching PID value are filtered. To identify which PID corresponds to which program, signal tables are transmitted with a description of each program carried within the MPEG-2 transport stream. Signal tables are sent separately from the packetized elementary stream (PES), and are not synchronized with the elementary streams (i.e., they are an independent control channel). The signal tables include:

PAT—Program Association Table (lists the PIDs of tables describing each program), PMT—Program Map Table (defines the set of PIDs associated with a program), CAT—Conditional Access Table (defines type of scrambling used and PID values of transport streams which contain the conditional access management and entitlement information), NIT—Network Information Table (contains details of the bearer network used to transmit the MPEG multiplex), and DSMCC—Digital Storage Media Command and Control (messages to the receivers).

To identify the required PID to de-multiplex a particular PES, a description is searched for in the Program Association Table. This lists all programs in the multiplex. Each program is associated with a set of PIDs (one for each PES) which correspond to a Program Map Table (PMT) carried as a separate program specific information (PSI) section. There is one PMT per program. Additional tables may also be provided:

BAT—Bouquet Association Table (groups services into logical groups),

SDT—Service Description Table (describes the name and other details of services), TDT—Time and Date Table (provides present time and date), RST—Running Status Table (provides status of a programmed transmission, allows for automatic event switching), and EIT—Event Information Table (provides details of a programmed transmission).

A conditional access system 1200 is connected to multiplexer 1040 and STB 1140, and is located partly at the headend and partly at the user location. Conditional access system 1200 allows users to access only those services for which they are authorized. Generally speaking, conditional access system 1200 uses scrambling and encryption to prevent unauthorized reception of the signals transmitted to STB 1140 from the headend. Encryption is used to encrypt the control words (keys) that are transmitted with scrambled signals to enable the descrambler to descramble the scrambled signals. The control word is communicated to STB 1140 in encrypted form as part of an entitlement control message (ECM). The conditional access subsystem in STB 1140 decrypts the control word only when authorized to do so as determined by an entitlement management message (EMM) sent to the STB. Conditional access system 1200 may include ciphering units at the headend for ciphering the ECMs and the EMMs, and a smartcard at the user location for decrypting the ciphered ECMs and EMMs so that the control words for descrambling may be recovered. Conditional access system 1200 may be the MediaGuard digital conditional access system designed by Société Européenne de Contrôle d'Accès (SECA), a joint venture between CANAL+ and Bertelsmann. Of course, other conditional access systems may be used and the system of FIG. 2 is not limited to any particular conditional access system.

An interactive system (communication server) 1220 enables the end user to interact with various applications via a back channel 1240 (e.g., public switched telephone network, wireless telephone network, internet, or the cable system itself using a cable modem). Interactive system 1220 is connected to a "data network" 1041 representing headend and/or internet servers. Back channel 1240 may also be used for communication in connection with the conditional access system 1200. Interactive system 1220 may be used, for example, to enable the user to communicate immediately with the headend to demand authorization to watch a particular event, download an application, communicate purchase data, request information, etc. The components of interactive system 1220 will depend on the nature of back channel 1240 and may include appropriate transmitters, receivers, modems, and/or network interfaces.

FIG. 3A shows an example STB 1140. STB 1140 includes a central processor 220 including associated memory elements and adapted to receive input data from a serial interface 222, a television system interface 224, an optional modem 226 (e.g., a telco modem or a DAVIC-based cable modem connected to the back channel 1240 of FIG. 2), switch contacts 228 on the front panel of STB 1140, and an infra-red remote control 230 (via an infrared control unit 232). Input may also be received from an optional infrared keyboard (not shown). Other interfaces (such as a parallel interface, a universal serial bus, S-video, Fire wire, etc.) may also be provided. STB 1140 also possesses a smartcard reader 234 adapted to read a subscription smartcard 236. Another card reader (not shown) for reading credit cards, bank cards, debit cards and the like may also be provided. Smartcard reader 234 engages with an inserted subscription smartcard 236 and with a conditional access unit 238 to supply the necessary control word to a demultiplexer/descrambler 240 to enable encrypted broadcast signals to be descrambled.

STB 1140 also includes a tuner 242 and demodulator 244 (e.g., a 256 QAM demodulator) to receive and demodulate the received transmissions which are then filtered and demultiplexed by unit 240. It will be appreciated that tuner 242 could in fact be multiple MPEG tuners.

Central processor 220 may, for example, be a microprocessor running at 50 MHz or more. The memory of STB 1140 may include EEPROM, host RAM, flash memory for software and data, MPEG RAM and graphics RAM. Central processor 220 generally handles the processing of data within STB 1140. In the case of received audio and video signals, the MPEG packets containing these signals are demultiplexed and filtered so as to pass real time audio and video data in the form of a packetized elementary stream (PES) of audio and visual data to dedicated audio and video processors (decoders) 246, 248. The converted output from audio processor 246 passes to a preamplifier 250 and thereafter to an audio output of STB 1140. The converted output from the video processor 248 passes via a graphic processor 252 and an encoder 254 (e.g., NTSC, PAL or SECAM) to a video output of STB 1140.

Graphics processor 252 is preferably designed to generate a screen display combining moving images together with overlaid text or other images. More specifically, graphics processor 252 can combine four layers: a stills layer, a moving image layer, a graphics layer and a cursor layer. Graphics processor 252 additionally receives graphic data for display (such as generated images, etc.) from central processor 220 and combines this information with information received from video decoder 248 to generate the screen display.

Figure 3B:
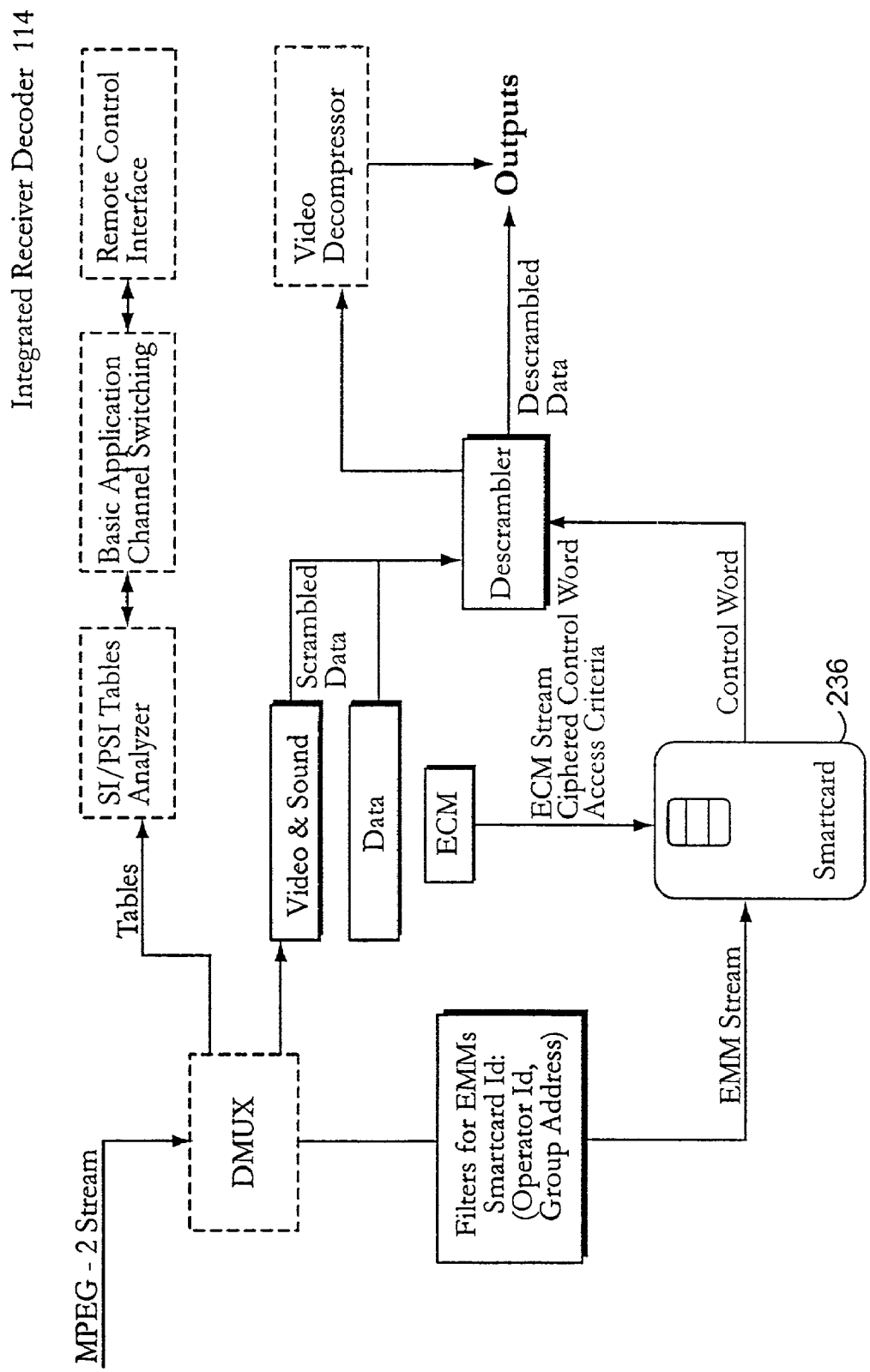
FIG. 3B shows the data flow in example STB 1140.

FIG. 3B shows the data flow in example STB 1140. STB 1140 receives the MPEG-2 data stream from the headend and demuliplexes it to obtain one stream containing scrambled programs with ciphered ECMs and another stream containing ciphered EMMs. If a program is not scrambled, STB 1140 decompresses the program and transforms the digital signal into a regular TV signal, data stream, or other type of flow according to the kind of data being broadcast. If a program is scrambled, STB 1140 extracts the ECM corresponding to this program from the MPEG-2 stream and supplies it to smartcard 236. Smartcard 236 determines whether it has the rights (e.g., with reference to an access rights table) to decipher this ECM and to access the associated program. If not, a negative status is passed to STB 1140, indicating that this program cannot be descrambled. If smartcard 236 has the rights, the ECM is deciphered and the control word is delivered to the descrambler. The descrambler then descrambles the program using this control word. The stream is then decompressed and translated into a regular TV signal, data stream or other kind of flow.

Figure 3C:
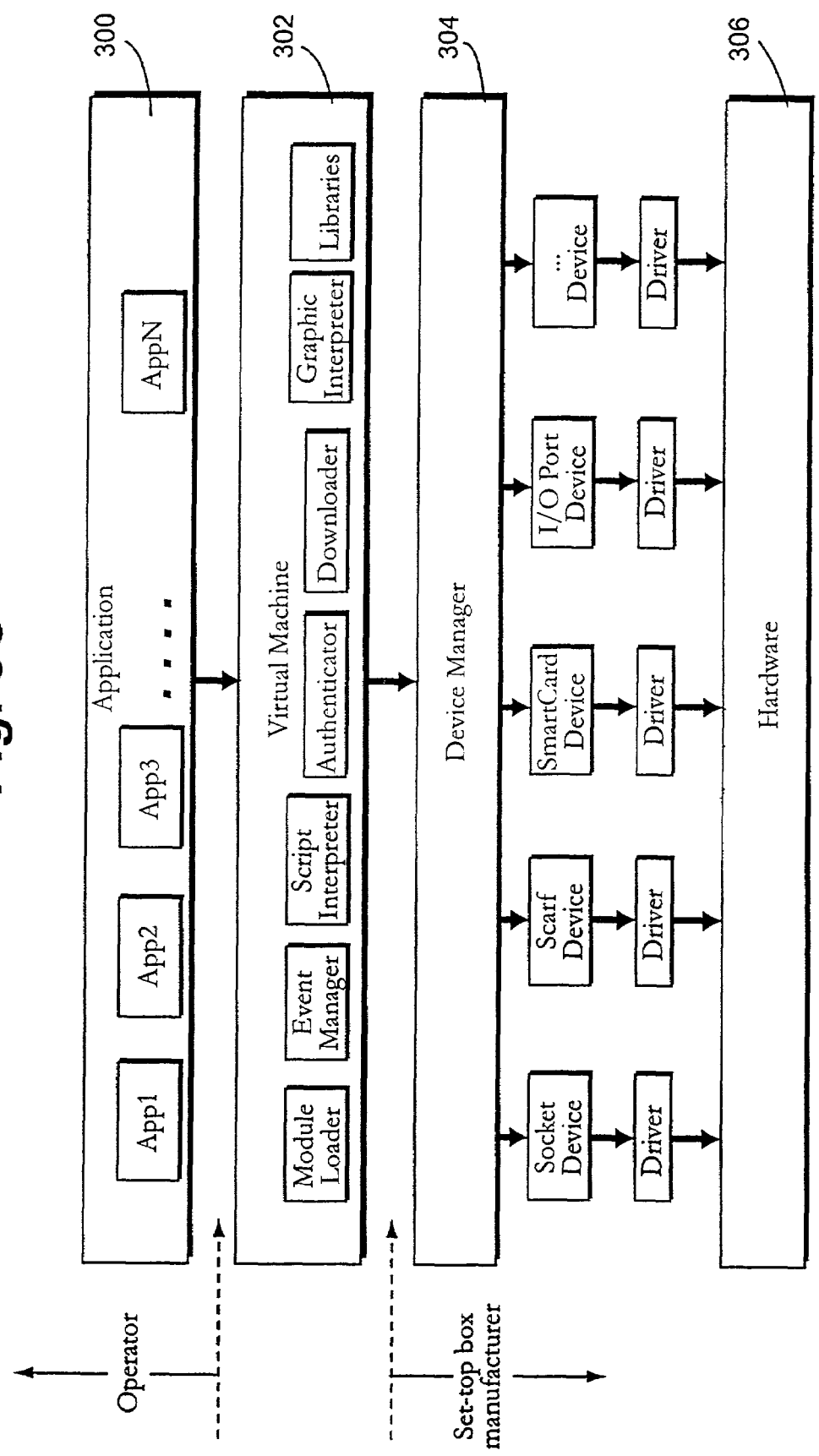
FIG. 3C shows a software architecture usable for example STB 1140 shown in FIG. 3A.

In terms of the hardware architecture, the STB is equipped with processing circuitry (e.g., microprocessors, application specific integrated circuits, programmable logic arrays and/or the like), memory elements such as ROM, RAM and flash memory as described above. The overall software architecture of the STB may correspond to that used in known STBs and will not be described herein in great detail. It may be based, for example, on a virtual machine interacting via an interface layer with a lower level operating system implemented in the hardware components of the decoder. The software architecture may be the MediaHighway software architecture available from Canal+. One implementation of this software architecture is shown generally in FIG. 3C and includes an application layer 300, a virtual machine layer 302 based on the JAVA language, a device manager layer 304 and a hardware layer 306. Virtual machine layer 302 includes the software used to interpret an interactive application contained in application layer 300.

Central processor 220 may be adapted to run a number of applications defining the functionality of STB 1140. An application introduced into STB 1140 corresponds to a section of code introduced into the machine that permits the control, for example, of higher-level functions of the machine. Applications may be resident applications stored in the memory (e.g., ROM or flash memory) of STB 1140 or applications may be broadcast, downloaded or uploaded via an interface of STB 1140 such as serial interface 222, cable interface 224, card reader 234, etc. Applications can include navigation tools, channel tuning (of analog and digital services), program guide applications, games, pay-per-view applications, sleep timer, STB diagnostics, emergency alert messages, interactive services, teleshopping applications, as well as initiating applications to enable the decoder to be immediately operational upon start-up and applications for configuring the STB. Applications are stored in memory locations in STB 1140 and represented as resource files comprising graphic object description files, unit files, variable block files, instruction sequence files, application files, data files, etc.

Conventionally, applications downloaded into STB 1140 via the broadcast link are divided into modules, each module corresponding to one or more MPEG tables. Each MPEG table may be divided into a number of sections. In the case in which data transfer also occurs via a serial (or parallel or USB) port, modules are similarly split into tables and sections, the size of the section depending on the channel used. In the case of broadcast transmission, modules are transported in the form of data packets within respective types of data streams, for example, a video data stream, an audio data stream, a text data stream. Generally speaking, there is a PID for each stream (which comprises many packets) within the transport. For example, an audio stream will have many packets all containing the same PID. The PID is how the STB identifies a given stream.

In a digital broadcast system, information is carried on a plurality of frequency channels of a fixed and predetermined bandwidth. A plurality of audio and/or visual data streams may be contained within a single frequency channel. For example, a single video stream may be associated with a plurality of audio streams, dubbing the program in a number of languages. Alternatively or in addition, multiple video streams may be contained in the packet stream associated with the frequency channel and showing, for example, the same sporting event from different camera positions. While these different audio and video streams are broadcast within the same frequency channel, the user may perceive changing the audio/video stream within that frequency channel as corresponding to a real change of channel.

In addition to conventional audiovisual program information, other data may be carried in a frequency channel. For example, this data may include menu display information associated with updated program summaries, etc. The PID values of such data may again be available via a PMT table. In one example implementation, STB 1140 may receive one or more of analog NTSC television programs, MPEG-2 encoded video with AC-3 audio programs, encrypted MPEG-2 encoded video with AC-3 audio programs (e.g., subscription and pay-per-view programs), and AC-3 audio only content programs.

Figure 3D:
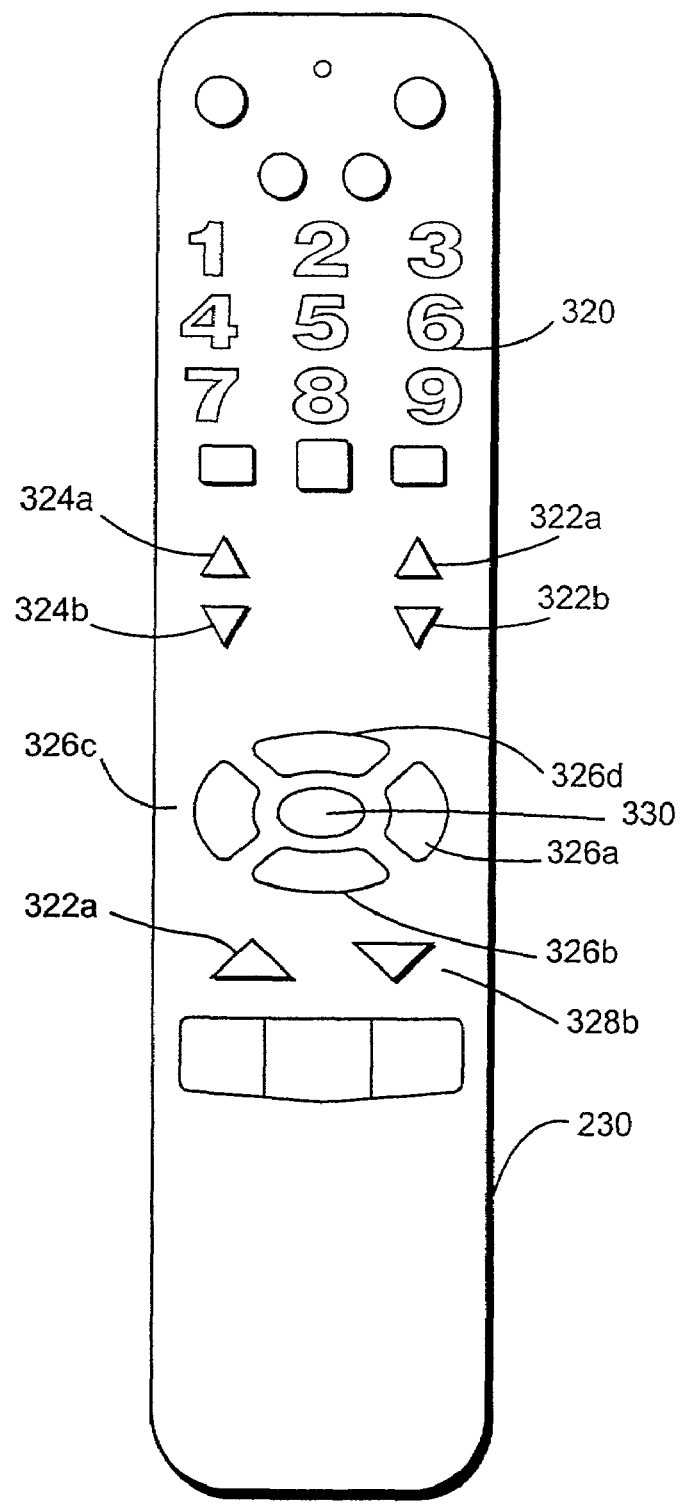
FIG. 3D illustrates a remote control usable with example STB 1140.

FIG. 3D illustrates a remote control 230 usable with STB 1140. Remote control 230 includes a numeric keypad 320; channel up/down keys 322a, 322b; volume up/down keys 324a, 324b; cursor movement keys 326a, 326b, 326c and 326d; page up/down keys 328a, 328b; and an "OK" key 330. Various other keys for favorite channels, last channel recall, mute on/off and the like may be provided as is well-known. Of course, the configuration of the remote control shown in FIG. 3D is provided by way of illustration, not limitation and the present invention is not in any way limited to any particular type of remote control.

Referring to FIGS. 1A and 1B, the services offered in the illustrative digital television system are accessible using a portal. When a user inputs (e.g., using remote control 230) a command for accessing the portal, STB 1140 changes to the frequency channel associated with the portal and the portal, such as that shown in FIG. 1A or 1B, is displayed. For example, portal 100 of FIG. 1A may be broadcast on a particular channel and so when the numerical button corresponding to this particular channel is pressed on remote control 230, STB 1140 tunes to that channel to display the portal. Portal 200 of FIG. 1B may also be broadcast on a particular channel (or channels). A system operator may offer such channels as part of an "extended" or "premium" service. A shopping network may, for example, advantageously use portal 200 of FIG. 1B to ease the process by which products are purchased by users. A "portal enhanced" version of the shopping network may be made available on a first channel (e.g., channel 15), while a non-enhanced (i.e., normal) version of the shopping network may be made available on a second channel (e.g., channel 16).

The portals shown in FIGS. 1A and 1B may include two or more pages. Each page may correspond to its own channel or more than one page may correspond to a single channel. Thus, the portals of FIGS. 1A and 1B can navigate multiple pages from a single "channel". This is managed via private portal configuration tables described in greater detail below.

Figure 4A:
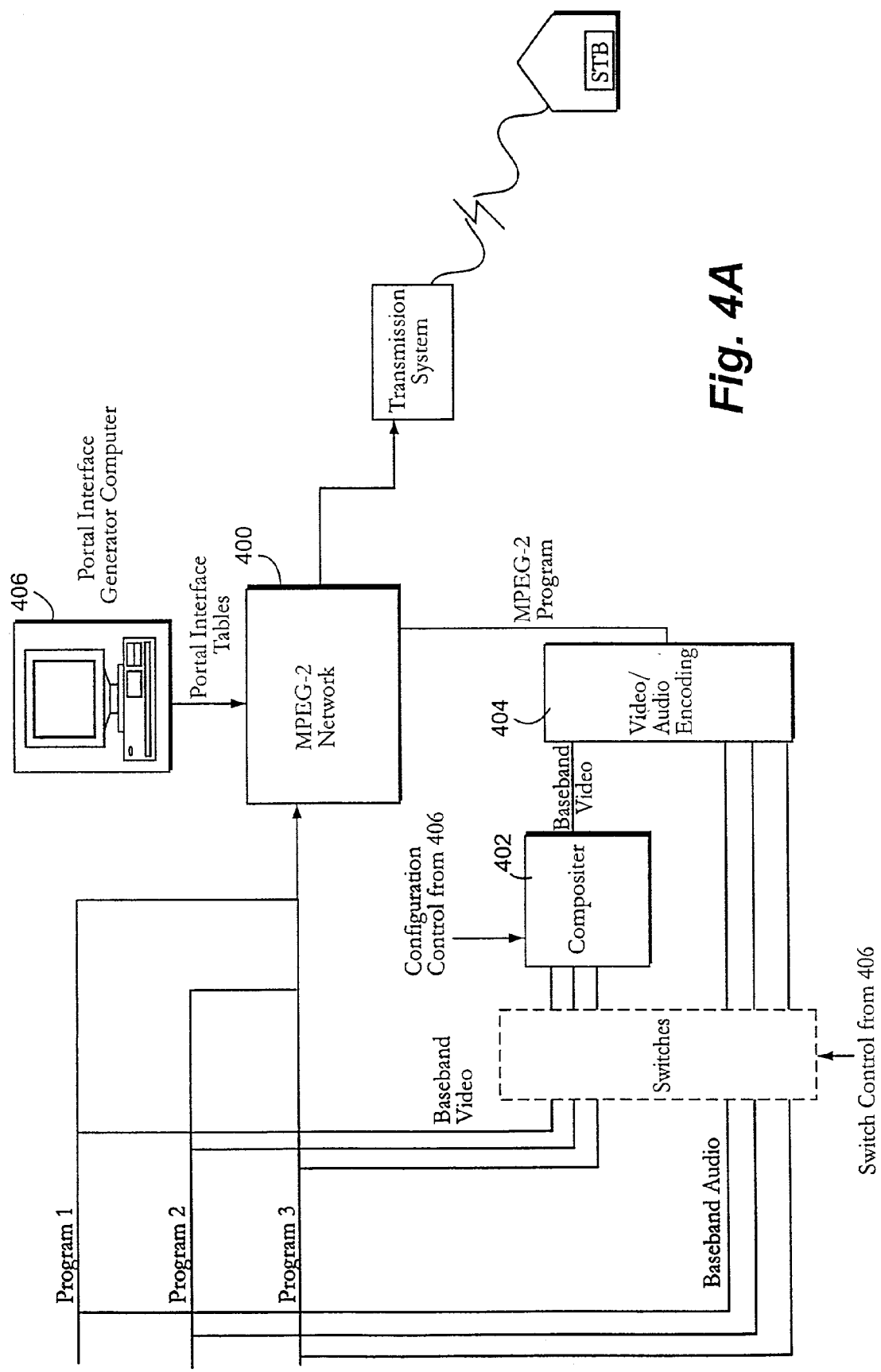
FIG. 4A shows elements of an example transmission system associated with a portal.

FIG. 4A depicts a headend arrangement for generating a portal including video and audio for a plurality of channels. Signals for a plurality of programs (received for example from a satellite) are supplied to video processing equipment for encoding and, as appropriate, encrypting the programs. Three programs 1, 2 and 3 are shown in FIG. 4A although the invention is not limited to any particular number. The video processing equipment is shown in FIG. 4A as MPEG-2 network 400. Circuits for MPEG-encoding and for the encrypting of digital data streams are well-known and will not be described herein. The video portions of the programs are also supplied to a compositer 402 that resizes and repositions the video signals within one or more display screens, which are then supplied to a video/audio encoder 404 and to MPEG-2 network 400 as one or more MPEG-2 programs. A background graphic mask is preferably included in the composited screen. This allows the operator to easily reconfigure the look and feel and reduces the size of the downloaded portal interface application because it does not need to include a background graphic. It also increases the start-up speed of the portal interface because the full-screen portal interface screen is displayed via tuning, rather than tuning and then drawing graphics using graphics processor 242. The audio portions of the programs are supplied to video/audio encoder 404 and then to MPEG-2 network 400.

The same Program Clock Reference (PCR) is used for the composited video and all the associated audio signals. This enables synchronization of the audio with the video during playback. Also, as shown in FIG. 4A, the audio signals for the programs in the portal screens are duplicated. That is, the audio stream is contained in the full screen program and in the MPEG-2 portal program. This allows the portal to play audio for channels on a different transport because, for example, an STB with one tuner cannot tune to the portal video programming on transport X and the audio for the highlighted program on Transport Y at the same time. Thus, the audio signals are duplicated on the portal transport. It also allows the portal to represent analog channels since an analog channel would not have a separately decodable MPEG audio stream.

Other data may be introduced to MPEG network 400 by a portal computer 406. While FIG. 4A shows portal computer 406 as a single computer, the portal computer may in fact be made up of two or more stand-alone or networked computers. This further data may include visual objects to be associated with cells other than those cells associated with television channels. Portal computer 406 also generates portal configuration data relating to the configuration of the elements in the mosaic. The configuration data is generated by a graphical editing tool that converts the data into MPEG table sections and broadcasts it within the MPEG stream as a private table. The configuration data typically includes a description of the number of mosaic pages, the size and position of each screen element within each mosaic, the desired size of the frame cursor and the limits of cursor movement. This information is used to enable the application of STB 1140 to correctly position and move the frame cursor. In addition, the configuration data includes the position of each channel in the portals (page number and coordinates) and the PID of the associated audio soundtrack in the assembled portal program. In order to enable the application of STB 1140 to change directly to a desired channel, the configuration data should also include the details of the channel (e.g., DVB triplet—network ID, Transport ID, program number) associated with a given cell. For those cells that launch applications other than tuning operations, the configuration data should include information sufficient for STB 1140 to launch the associated application. In the case of an application running on the Media-Highway platform mentioned above, this would include a unique application ID. For a downloaded application, this ID is then referenced in the Application Information Table—AIT (DVB table). The AIT describes where to find the downloaded application within the DSMCC data carousel. For resident applications, the list of application IDs is stored within a private table in the middleware image.

Program access details (pay-per-view, subscription, etc.) may also be included in the configuration data to enable the application of STB 1140 to carry out the operations to prevent a user from watching and listening to an access prohibited channel via the portal. The configuration data includes the commercial offer for the program so STB 1140 can determine if it has access rights. If this access information were not included in the configuration data, STB 1140 would have to tune to the transport containing the selected program to read the CAS data from the standard tables. A graphic mask is displayed to block a channel to which the user does not have access rights. This could be because the whole channel was locked by the user, the user is not subscribed to the channel or event, or the event has a rating exceeding the configured morality filter. These masks will be updated automatically as event transitions occur. In addition, the configuration data includes the PID value of each portal page and a default header message (if any) associated with that portal page to enable the portal to navigate between multiple pages on a single channel.

In one implementation, the architecture of FIG. 4A is used to generate the entire portal shown in FIG. 1A or the entire portal shown in FIG. 1B. That is, the components of FIG. 4A may be used to generate the cells, their visual objects, their underlying applications and the configuration data for controlling the display of the portal on the television screen.

Figure 4B:
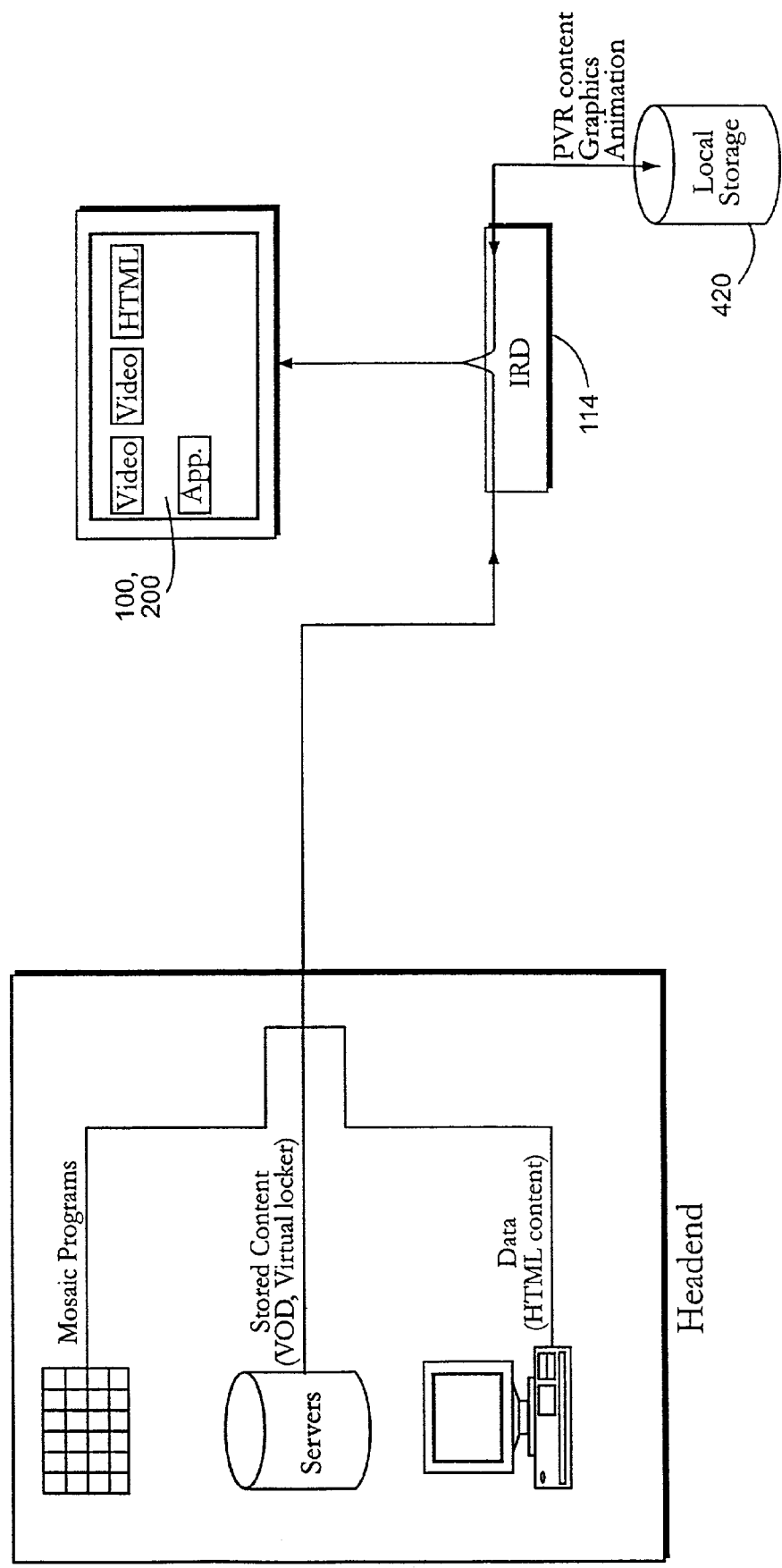
FIG. 4B shows the various sources for composing a portal.

In another example implementation, the portal may include both elements generated at the headend using the elements of FIG. 4A and elements generated locally at the location of STB 1140. This implementation is explained with reference to FIG. 4B which shows that portals 100, 200 may be made up of, for example, video cells, HTML cells, and application cells. These cells, the visual objects and the underlying applications may be generated as a combination of headend content such as mosaic programs, stored content, and data (e.g., HTML content) and local content such as PVR content, graphics, and animation from a local storage device 420 (such as a hard-disk, optical disk, semiconductor memory, etc.) that is part of or coupled to STB 1140. Thus, for example, with reference to FIG. 1B, cells 202-1, 202-2, the video in window 204, and the configuration data for configuring these cells and video may be generated at the headend. Cell 202-3 may be generated from data stored in storage device 420 and then "added" by graphics processor 252 to the portal portion transmitted from the headend. This arrangement offers the possibility of a more personalized portal that can take into account the preferences of a particular user. Thus, cell 202-3 may be based either on preferences entered by the user or on preferences as determined by an application running on STB 1140. For example, a sports enthusiast may always want to be able to launch an application that provides up-to-the-minute sports scores, either for a particular sport or a particular team or teams. Thus, the user may enter, using for example remote control 230, information that causes STB 1140 to provide a cell such as cell 202-3 that provides such ability. The visual objects, application code, and configuration data needed to provide cell 202-3 may be pre-stored in the STB memory or may be provided to the STB via serial interface 222, smartcard 236 or the data stream from the headend received by interface 224. Other uses for "locally" generated content include the above-described PVR navigator. In this case, the cell represents local audio/video content, and the portal, or parts of the portal, are built locally.

It is of course also possible for STB 1140 to locally generate the entire portal based on the data it receives. However, this is very "resource-intensive" and will typically reduce system performance. Nonetheless, if central processor 220 has sufficient processing power so that system performance is not (or at least is only minimally) reduced, the portals may be generated by STB 1140.

Figure 5A:
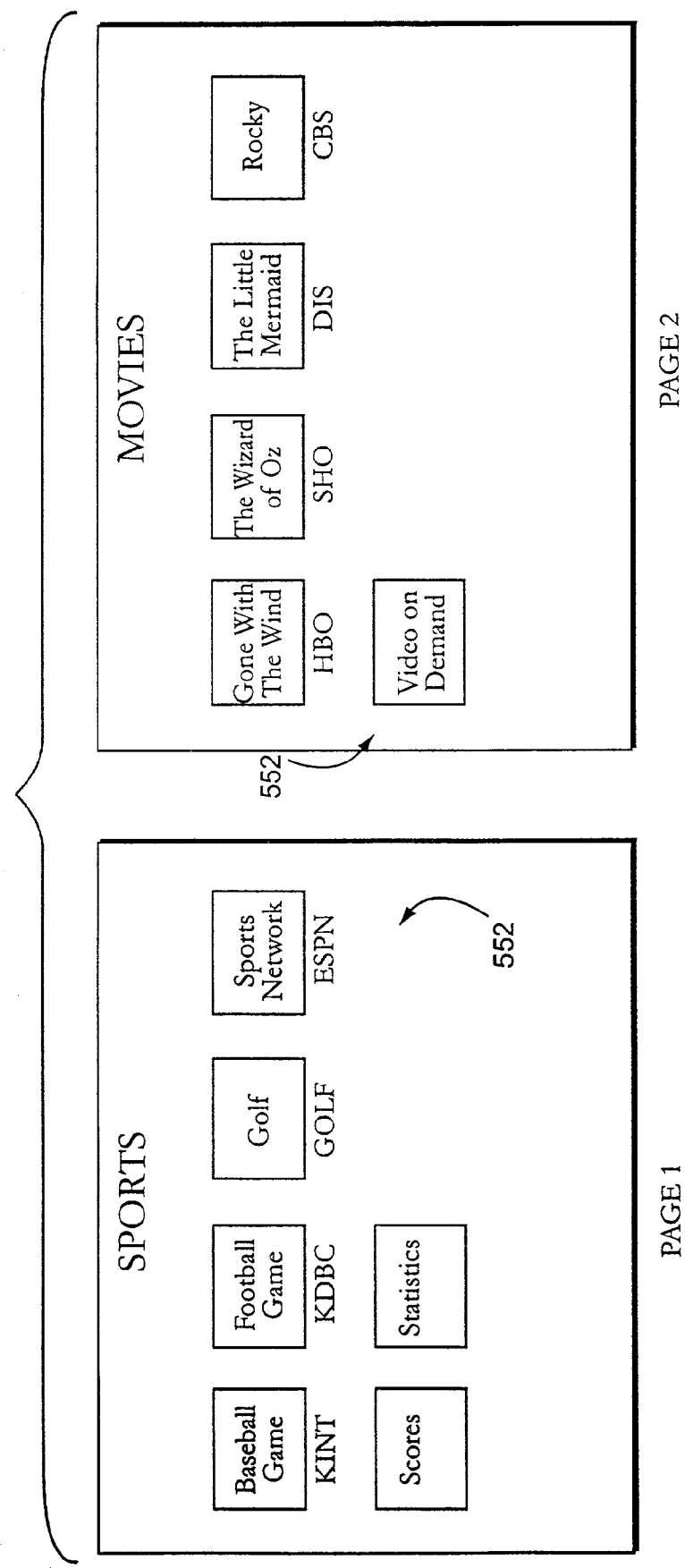
FIGS. 5A–5E illustrate example portals.
Figure 5B:
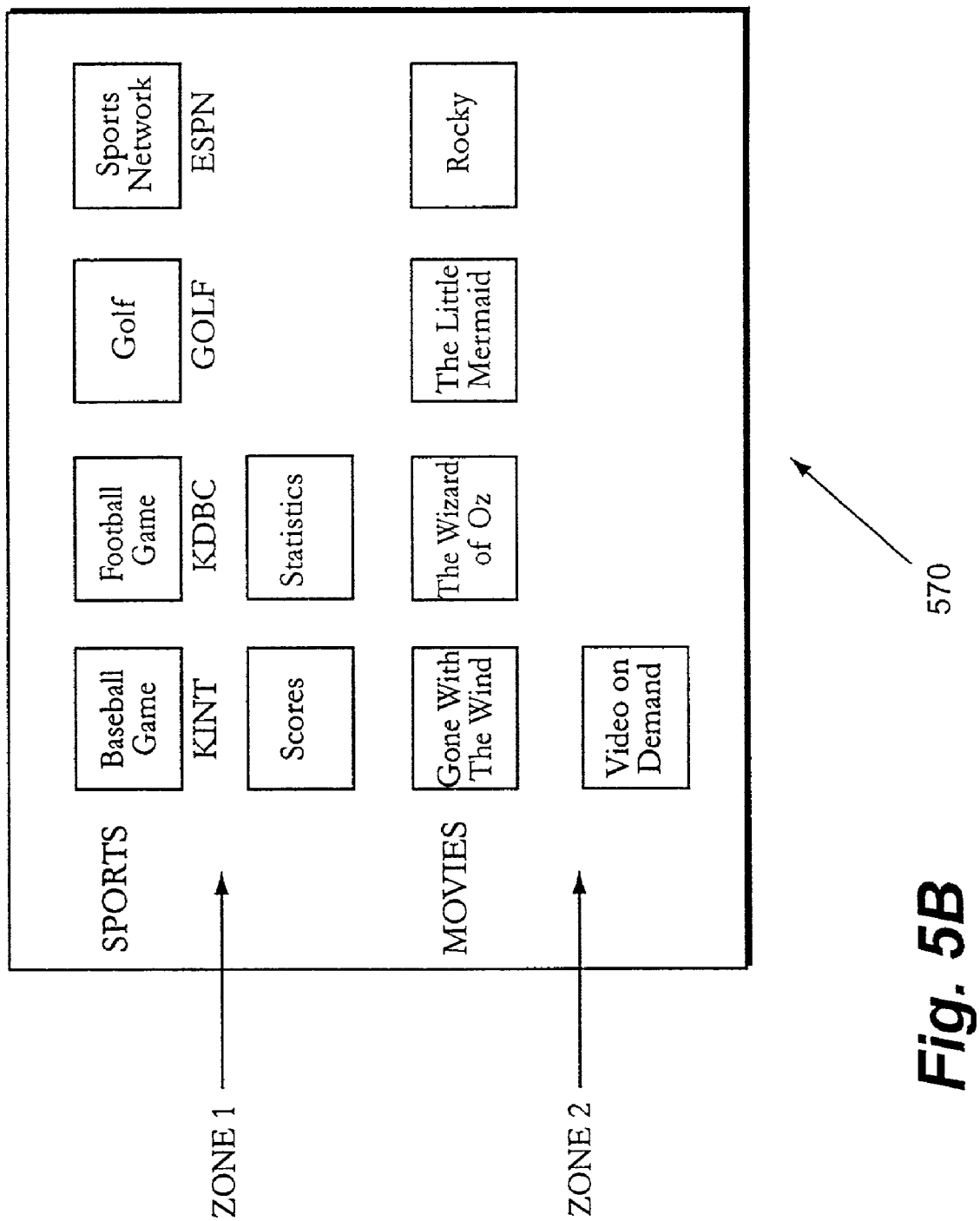

As mentioned above, the cells may be dynamic and context sensitive. For example, portal computer 406 may be configured to parse the program information associated with the programs 1, 2, 3, . . . and then organize the video signals in the portal based on some characteristic of the programs being broadcast. As one illustration, this characteristic may be the theme or genre (e.g., sports, movies, talk shows, children, news shows, comedy, drama, etc.) of the programs being broadcast. In this case, the portal may be arranged so that the cells of certain pages or of certain zones are associated with programs and/or applications having a particular theme. FIG. 5A shows an example portal 550 including a first page whose cells are associated with channels providing sports programming (e.g., a baseball game on channel KINT, a football game on channel KDBC, golf on the Golf Channel, and the sports network ESPN) and with sports-related applications (e.g., scores, statistics) and a second page whose cells are associated with channels showing movies (e.g., Gone with the Wind on HBO, The Wizard of Oz on Showtime, The Little Mermaid on Disney, and Rocky on CBS) and with movie-related applications (e.g., video-on-demand). Arrows 552 permit the user to move between page 1 and page 2. FIG. 5B shows an example portal 570 including a page having a first zone (Zone 1) whose cells are associated with channels providing sports programming and with sports-related applications and a second zone (Zone 2) whose cells are associated with channels showing movies and with movie-related applications.

Because certain channels only provide sports programming at certain times (e.g., Sunday afternoon football games, Monday night football games), portals 550 and 570 are dynamically reorganized as the programming content on the channels changes over time. For example, if the portal includes a sports page, this page may contain ABC, FOX, ESPN, and the Golf Channel at 5:00, and then contain CBS, FOX-ALTERNATE, ESPN, and the Golf Channel at 6:00. Thus, as event transitions occur, the channels contained in the sports page will change as well. This can be implemented by configuring the headend portal computer 406 to continuously parse the program information, generate the correct portal configuration information based on the program information, and control the headend equipment to route the correct programming to video composter 402 (e.g., by the switches shown in FIG. 4A) and/or control video composter 402 to arrange the programming routed thereto in a particular manner.

Cells of the portals may be generated for specified periods of time. For example, in portal 200 of FIG. 1B, window 204 may be showing a talk show on which an author of a book is appearing. One of cells 202-1 to 202-3 may be associated with an application that allows a user to purchase the book. In this case, headend portal computer 406 may generate portal configuration information so that the book purchase cell is generated for portal 200 either for the duration of the talk show or for the duration of the author's appearance on the talk show.

In the case of cells generated at the headend, the dynamic and context sensitive features may be provided using the elements shown in FIG. 4. In the case of cells generated locally by STB 1140, the particular cell (or cells) added to the portal portion transmitted from the headend may be changed depending on time or the context.

Figure 5C:
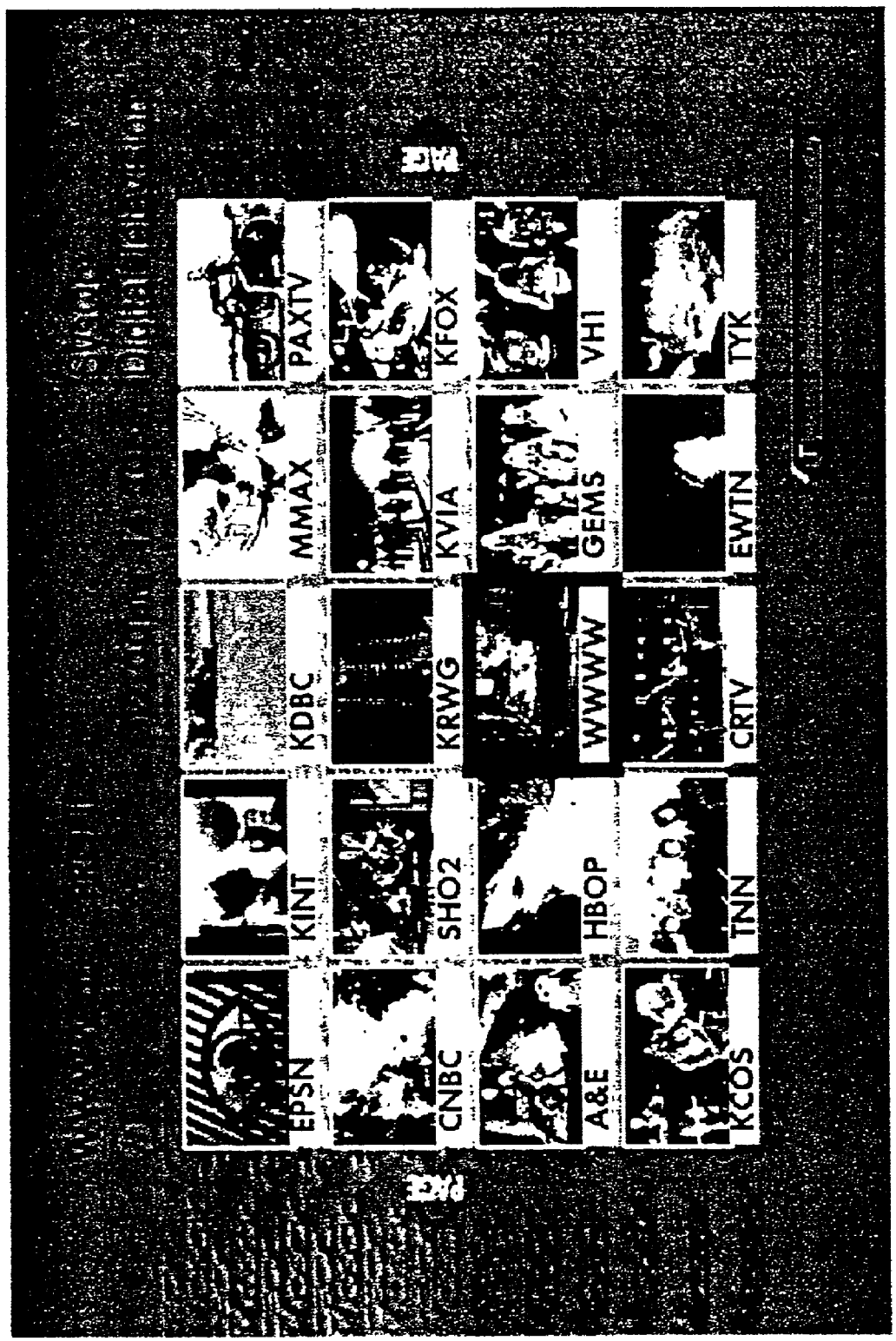

The portal may be implemented as a so-called video mosaic such as that shown in FIG. 5C. The video mosaic includes a graphical STB application, and a head-end application for generating the necessary control information. The core features include:

Displaying one or more pages with multiple live (current) video cells representing video channels within the system, Displaying a highlight cursor on the selected cell, Allowing the user to navigate between cells and pages using remote control 230, Tuning to the associated audio when the user highlights a cell, Updating the textual program information when the user highlights a cell, Displaying a graphic mask over cells corresponding to channels that have been locked via a user-configured parental control feature, that contain programming that exceeds a user-configured morality rating, or that contain content to which the user is not subscribed, Tuning to the associated full screen program when the user selects a cell, Allowing the system operator to generate and broadcast a mosaic configuration table from the headend. This table customizes how many cells are on a page, the number of pages, the position of cells on the screen, the highlight image, the program associated with each cell, advertising information, etc.

For the portal of FIG. 5C, the composite video stream and all of the audio streams are carried in a single MPEG-2 program sharing a common clock reference as explained above. The audio streams are duplicated in both the full screen program and the portal interface program. This allows the portal to tune to the audio of programs carried on different transport streams as further explained above.

As explained above with reference to FIG. 4A, the incoming program content goes through the standard network transport mechanisms for broadcasting the full screen program. In addition, the baseband video for each program contained in the mosaic is sent to a composite generator in the headend. This equipment generates a baseband video stream containing the composited cells that is then MPEG encoded. The audio is also duplicated to an MPEG (or AC-3) audio encoder. The resulting audio and video MPEG-2 streams are combined into a single program, and multiplexed into one of the network transport streams.

All of the control data for configuring the mosaic is input via a graphical user interface (GUI) on the portal computer. This GUI may, for example, be the Mosaic Editor application developed by Canal+ running on a Windows NT machine (e.g., the headend portal computer). The portal computer generates an MPEG-2 private mosaic table and injects it into the MPEG transport along with the composite program.

All of the information on locked, blocked or unauthorized channels is contained locally on the STB, and retrieved via APIs. The commercial offer (determines who is entitled to a channel) for each channel is contained in the private mosaic table. The local application processes this data, and determines which cells will be blocked for each subscriber.

The example portal of FIG. 5C may be extended into a general portal for viewing video channels, launching interactive applications, and interfacing with local or remote stored content. This will be the user's home base from which they can navigate to the different features within the system. The key features of this general portal include:

All of the video mosaic features mentioned above,

Display of an operator configurable combination of content within the portal interface. A given page may display a composite program consisting entirely of live video cells, a composite program containing some live video combined with locally displayed content, or a page consisting entirely of locally assembled content. The choice of programming for each cell, and the layout of cells and pages is controlled by the operator and can be modified at any time using the above-mentioned Mosaic Editor tool, Locally assembled content may include application graphics, locally stored content such as from a Personal Video Recorder (PVR), content from a head-end server such as VOD, internet content, etc. Basically, any content that will be dynamically acquired, and will not be contained in the head-end generated composite program. The portal may be used to navigate stored content (PVR, etc.). For example, a portal may be provided to PVR programs in which each cell represents a stored asset. The cell could be represented by a graphic, or still frame from the recorded file. When the cell is highlighted, it plays back the recorded video and shows status information such as record length, quality level, program synopsis, etc., Launch an interactive application when a cell is selected, Launch a sub-portal such as a video-on-demand (VOD) navigator, an electronic program guide (EPG), or a "game room", Display interactive advertising on the portal. These advertising can cycle at an operator configurable duration, and may be selected by the user to obtain further details or initiate an online purchase (similar to internet click-through advertising). The advertising may be global to the portal, or may change based on the highlighted cell, Allow the user to view future programming information for a cell. For example, when a cell is highlighted, the user can press the info key on the remote control to display an overlay containing textual programming information for the next N hours on that channel. This overlay would have standard EPG navigation features such as reminder timers or VCR/PVR triggers, Display operator configurable information within a region of the portal screen. (e.g. local weather report, an operator message, or a branding campaign), Extend the Mosaic Editor to configure these new features, Extend the headend portal computer to configure the portal dynamically based on the broadcast content. For example, the operator could configure a "sports" page that shows all the channels currently broadcasting sports programming. As event transitions occur, the channels contained in the page would change as well. This can be implemented by configuring the heaadend portal computer to parse the program information, generate the correct portal configuration information, and control audio/video routing equipment (e.g., the switches in FIG. 4A) to route the correct programming to the video compositer.

Figure 5D:
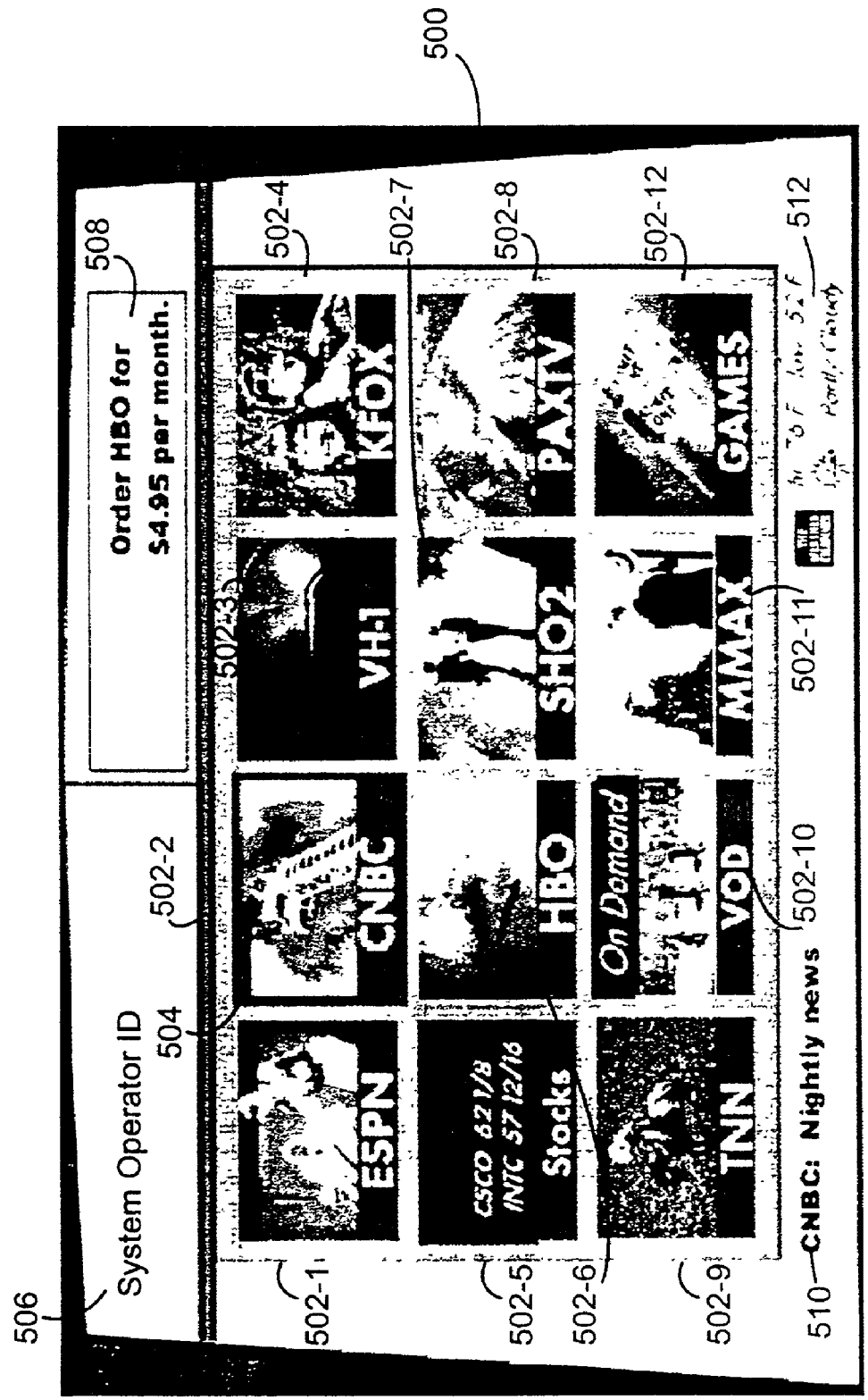

FIG. 5D illustrates a particular example portal for viewing video channels, launching interactive applications, and interfacing with local or remote stored content. This example is provided by way of illustration, not limitation, and the invention is not limited to particular arrangement or features of the example portal. Portal 500 takes the form of a twelve-cell mosaic of cells 502-1 to 502-12 arranged in a 3-row by 4-column matrix. A frame cursor 504 is positioned at the cell 502-2 for "CNBC". Example cells in portal 500 include cells for:

tuning to a television channel to watch a program (i.e., cells 502-1, 502-2, 502-4, 502-6, 502-7, 502-8, 502-9 and 502-11), video on-demand (i.e., cell 502-10), CD purchase (i.e., cell 502-3), games (cell 502-12), and a stock ticker (cell 502-5).

Each of the cells 502-1 to 502-12 has a visual object (e.g., video, still image(s) and/or a graphic) representing the underlying application. For example, in the case of a television channel, the cell shows the current video for that channel. For example, the video on demand may be barker video with movie clips and audio advertising the upcoming movies. The CD purchase cell may display a music video. The games cell displays a games ticket graphic still and the stock ticker cell displays a stock ticker video. As the user moves between the cells, any associated audio is played and a short description of the corresponding application is displayed in the lower left corner of the screen. When a particular cell is selected (e.g., by pressing OK key 330 on remote control 230), the underlying application is launched full-screen.

Portal 500 also includes a system operator identification portion 506; an advertising portion 508; an application information portion 510; and a message portion 512. System operator identification portion 506 provides system operators an opportunity to display system identification information textually and/or graphically. Advertising portion 508 is "selectable" using frame cursor 504 and provides "click-through" advertising. Click-through advertising allows the user to get additional information on a product/service and/or make an "on-line" purchase of the product/service. The advertisement displayed in portal 500 may be changed periodically (e.g., every 30 seconds, 1 minute, etc.). In one particular implementation, the click-through advertising is designed for simple impulse-type purchases such as premium cable services, PPV events, pizza, etc. More complicated, catalog-based products/services, like compact disk purchases, are better driven through one or more cells.

Application information portion 510 displays information associated with the cell highlighted using frame cursor 504. In the FIG. 5D portal, application information portion 510 displays the network name ("CNBC") and the program name ("Nightly News") of the program currently airing on that network. Message portion 512 displays weather information.

Positioning frame cursor 502 at one of the cells 502-1, 502-2, 502-4, 502-6, 502-7, 502-8, 502-9 and 502-11 for tuning to a television channel and then pressing "OK" key 330 on remote control 230 causes execution of an underlying application to tune to the corresponding channel and provide a full-screen display of the tuned channel.

The video on demand cell 502-10 allows users to see video (particularly movies) at a user-specified time. Video on demand may be implemented in different ways and this invention is not limited to any particular implementation. For example, a user may use a remote control to select a cell associated with video on demand. In some cases, the cell may be for a single video on demand event. In other cases, the cell may launch an application that causes a menu of video on demand choices to be displayed from which the user selects one choice. In either case, a message indicative of the user's video on demand choice is communicated to a video on demand server computer (which may be located at the headend or elsewhere). In response to the message, the server transmits the selected video to the user.

The games cell 502-12 allows users to launch gaming applications (e.g., blackjack, chess, etc.). For gaming applications that can be reasonably confined to a limited screen area, a window may be provided so that a user can continue watch television programs.

The stock ticker cell 502-5 launches an application that provides a summary of market indices (e.g., NASDAQ, Dow Jones Industrial Average, etc.), quotes for the most active issues, and, in some implementations, quotes for a user's personal portfolio.

CD purchase cell 502-3 launches an application that provides for the preview and purchase of music CDs.

Other applications that may be included in the "application suite" for the portal include cells for:

interactive talk show with interactive advertising, interactive sports, catalog product/service information and/or purchase, and sports scores.

Interactive talk show refers to an application that permits a user to display data regarding a talk show's guests, participate in user polls and view a highlight clip along with the main broadcast. The highlight clip may include a commercial, thereby providing integrated, interactive advertising. The user may, for example, request additional information regarding the advertised product or service. This additional information may be downloaded to the decoder for subsequent display or may involve an application that forwards the user's e-mail address to the headend. A server at the headend then generates an e-mail message for the user that contains the additional information and/or hyperlinks to the additional information. The user may also, for example, request a coupon for certain discounts in a similar manner.

Interactive sports refers to an application that permits a user watching one channel to be informed of the occurrence of an event (such as a soccer goal, a baseball homerun, a football touchdown, etc.) on another channel. This is accomplished by introducing in real time an event message concerning a live event broadcast on at least one channel into the data stream of at least one other channel. The event message includes information regarding the occurrence of an event and the channel on which the event has occurred. The user is notified a few seconds before the event and can tune to that channel to catch the action. Additional details of a system and method for providing this interactive sports feature is set forth in WO 99/22514, the contents of which are incorporated herein.

Figure 5E:
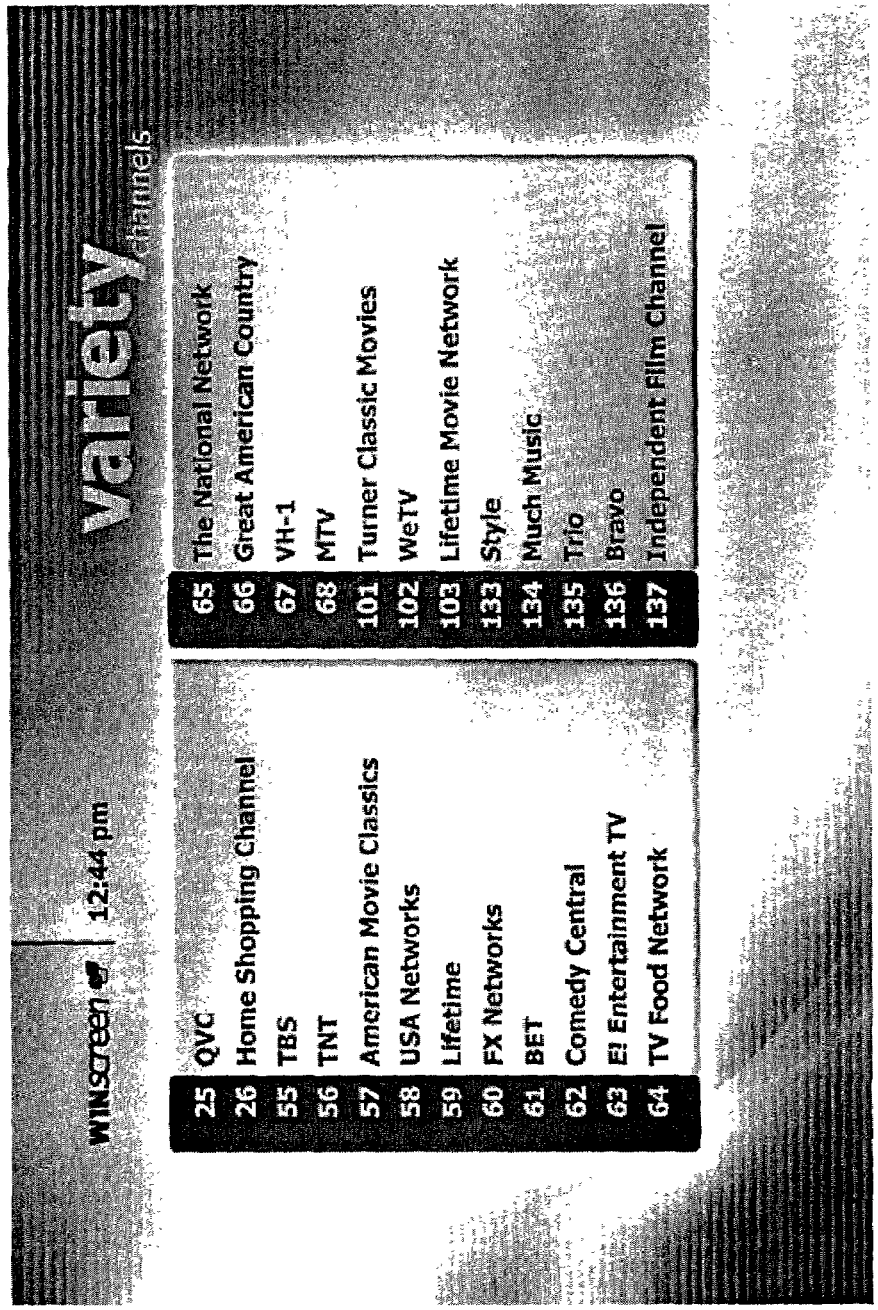

FIG. 5E illustrates another feature in accordance with the present invention. The portal may be implemented as a "service listing page." The service listing page comprises a graphical interface, providing textual information about current activity on selected channels. For example, if a user has access to a premium movie channel, activating the service listing page will display information on the current programs for all related channels. As another example, selecting "X," (variety channels in this example) as depicted in FIG. 5E, allows a user to scroll through all of the variety channels currently available. The service listing page can provide textual information regarding the current activity on any or all of these channels, and no restriction on the scope of the invention is intended by FIG. 5E.

Further, a cell may be provided on the service listing page that allows a user to quickly "jump" from one service listing page to another service listing page, so that textual information may be viewed about another channel. Furthermore, any cell can jump to the service listing page. For example, a video mosaic cell can jump to a service listing page. In addition, it is expressly within the scope of the present invention that the features described above in reference to other portals may be incorporated into the service listing page feature, such as advertising info, etc.

FIGS. 6–10 illustrate application flow for some of the above-identified applications.

Figure 6A:
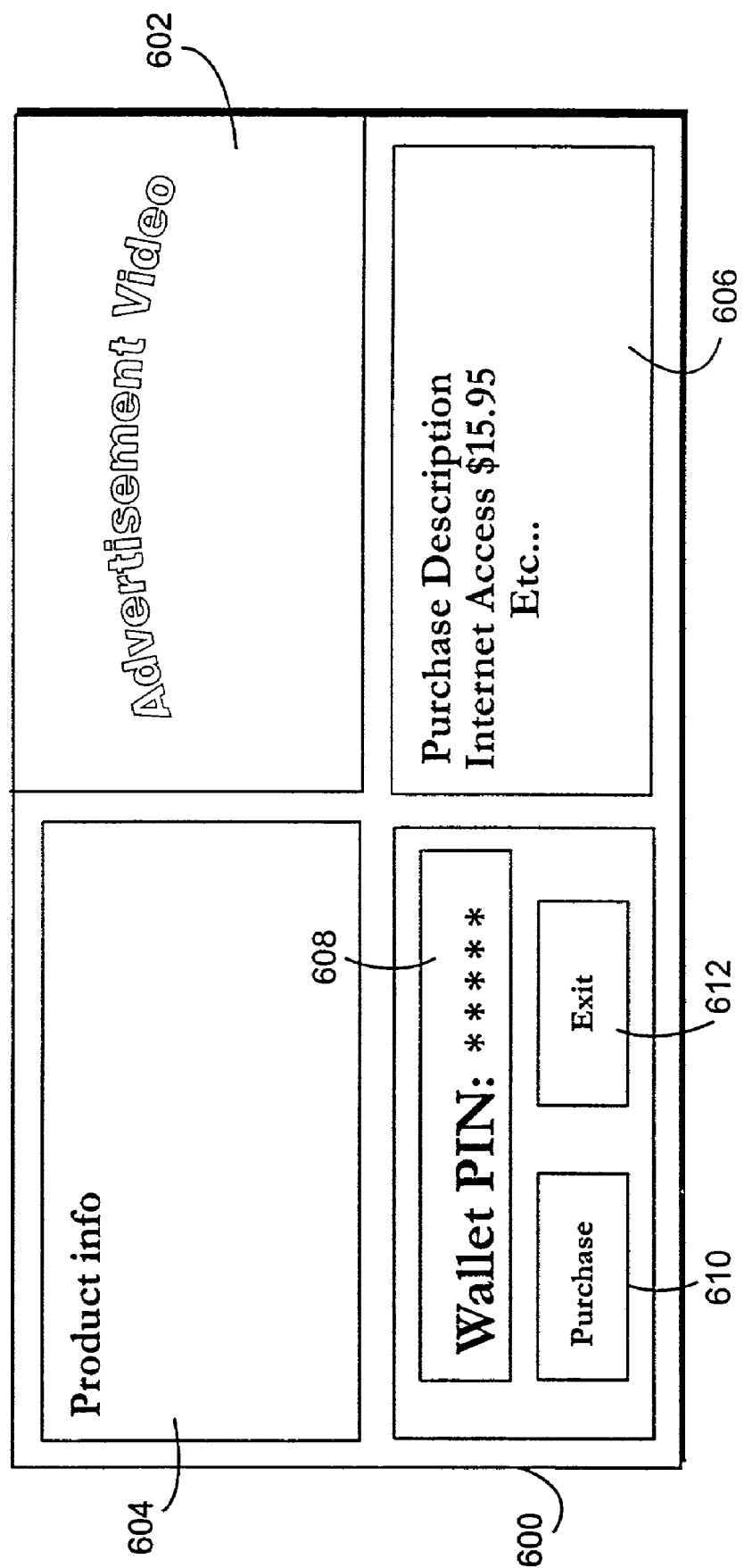

FIGS. 6A and 6B show an example of a click-through advertising application. FIG. 6A shows an initial purchase screen 600 with advertising video window 602 in the upper right and product information and purchase description information at 604 and 606, respectively. To make a purchase, the user enters his/her "wallet" PIN code in field 608 and presses (or clicks) "Purchase" button 610 (e.g., by positioning a highlight cursor thereon and pressing OK) to finalize the transaction. "Exit" button 612 allows the user to return to the application portal 500 and thus functions like a cancel key. Pressing "Purchase" button 610 displays the checkout screen 620 shown in FIG. 6B. This screen includes a screen title 622 (i.e, "Customer Check Out") and a purchase confirmation 624 that, in this example, identifies the price paid. Pressing "Exit" button 626 returns the user to portal 500 shown in FIG. 5D.

Figure 7A:
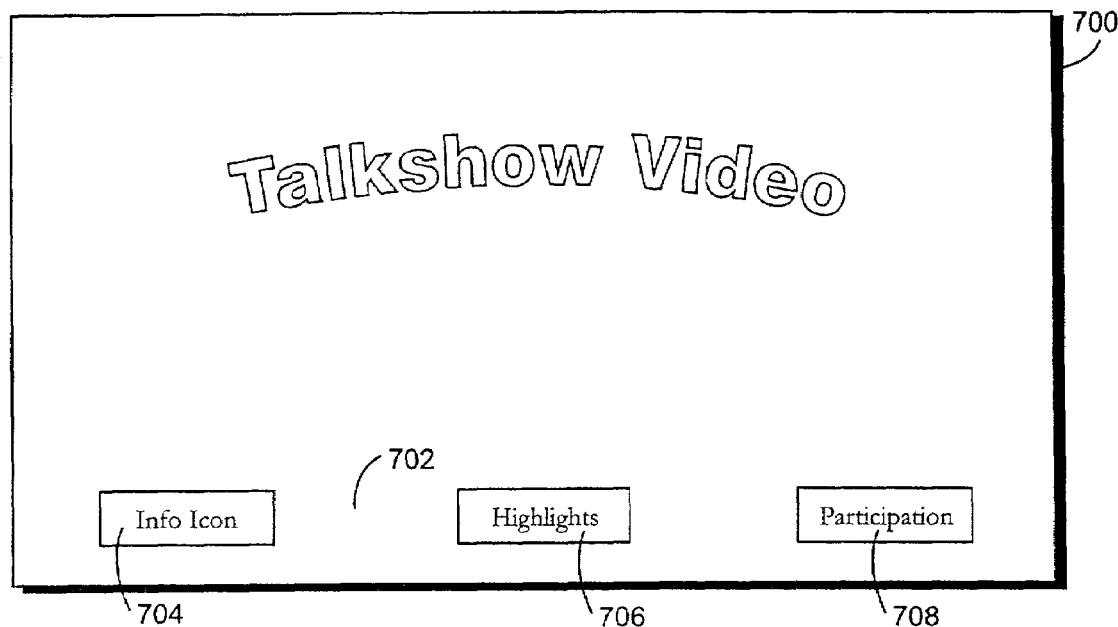
FIGS. 7A–D show an example of an interactive talk show application.
Figure 7B:
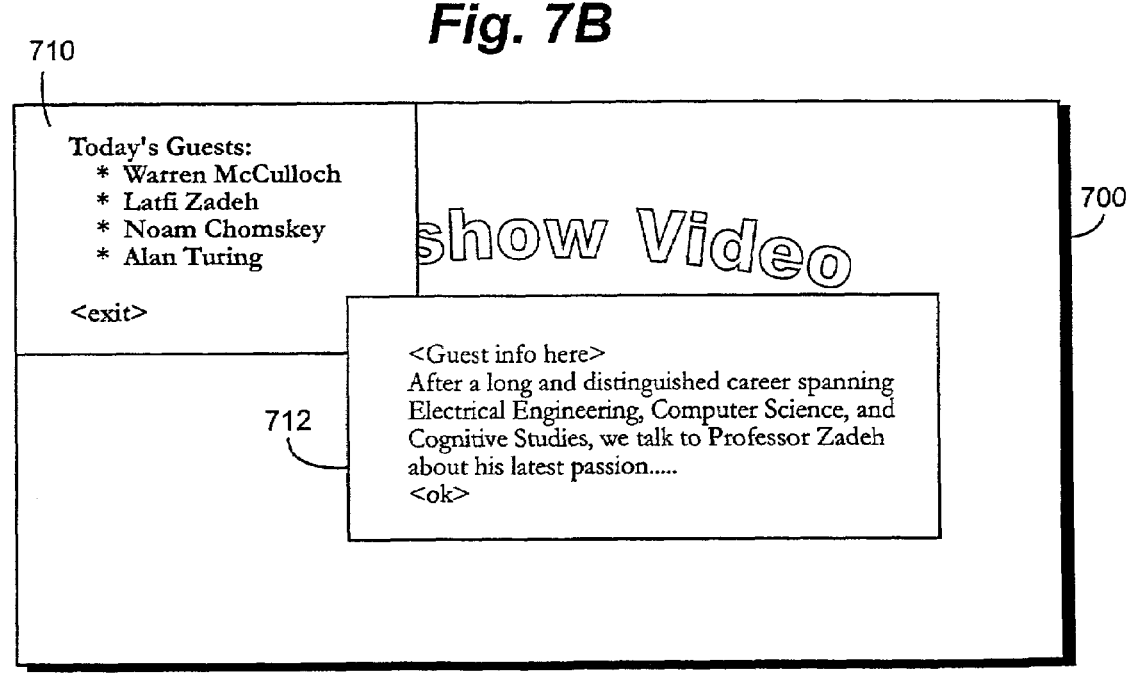
Figure 7C:
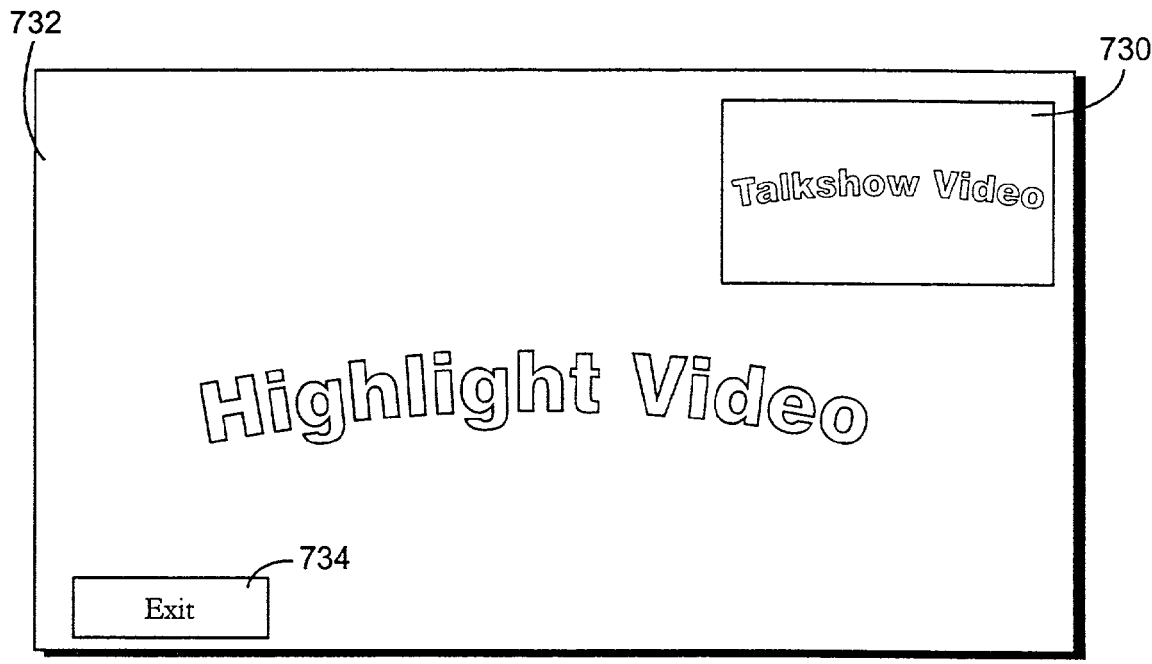
Figure 7D:
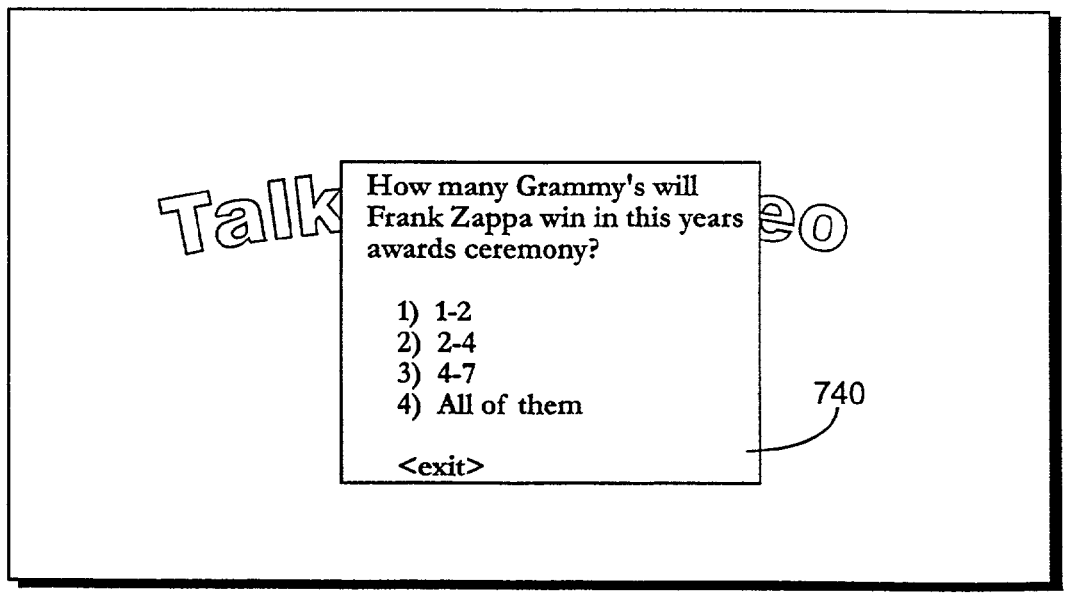

FIGS. 7A–D show an example of an interactive talk show application. FIG. 7A shows the main talk show screen 700 that includes a semi-transparent bar 702 across the bottom of the screen that includes an information icon 704, a highlights icon 706 and a participation icon 708. If the user selects information icon 704, an information cell 710 such as a list of guests on the show is displayed as shown in FIG. 7B. In this example, the text may be in a semi-transparent background overlaid in the upper left corner of screen 700. In the example shown in FIG. 7B, each entry in the information cell 710 can be highlighted using directional keys on remote control 230. When an entry is selected using "OK" key 330 on remote control 230, a new overlay 712 is displayed with details on the selected subject. If the highlights icon 706 is selected, a composite video is shown with the talk show video in a window 730 positioned at the upper right corner of the screen and a highlight clip looping in a main window 732 (as shown in FIG. 7C). "Exit" button 734 may be used to return to the main talk show video. If the participation icon 708 is selected, the user is prompted to answer a poll related to the talk-show topic. The polling is carried out using a pop-up window 740 positioned over the video (as shown in FIG. 7D) that allows the user to select from a multiple-choice list. Once a selection is made, the current results of the poll are preferably displayed in pop-up window 740. "Exit" may be selected from pop-up window 740 to return to the main talk show video.

Figure 8A:
FIGS. 8A–C show an example of an interactive sports application.
Figure 8B:
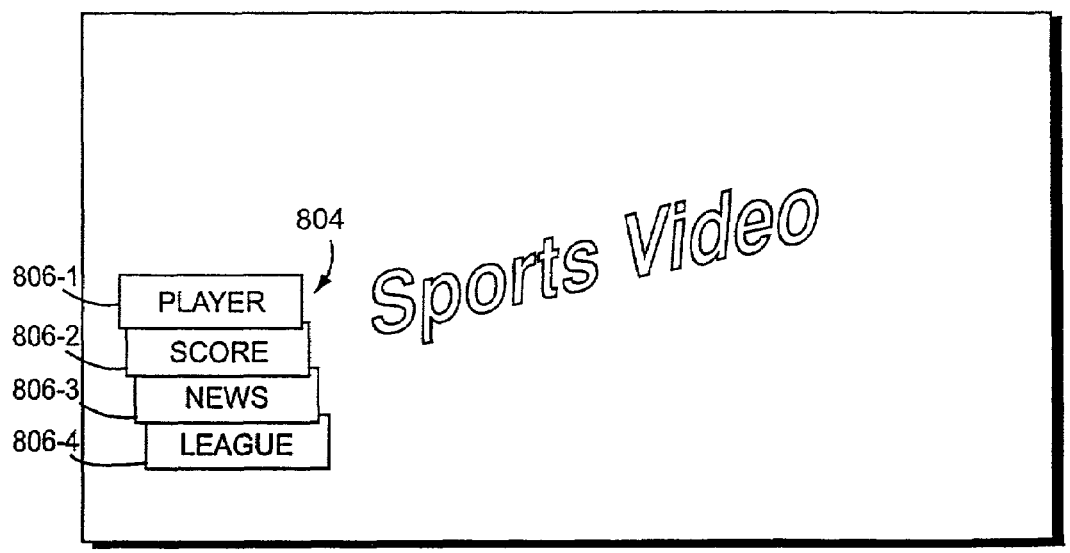
Figure 8C:
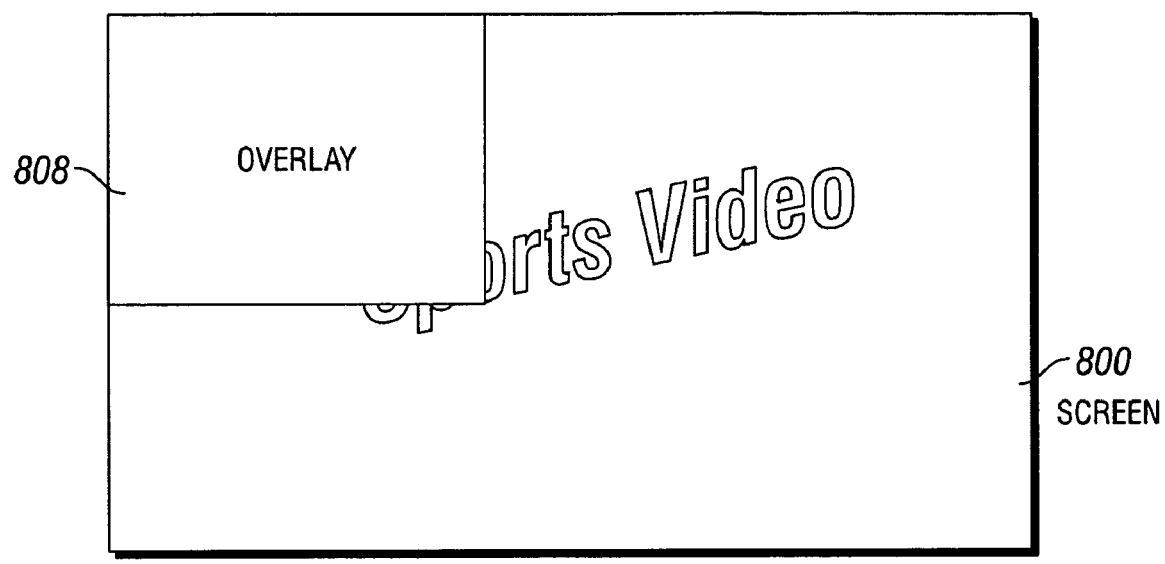

FIGS. 8A–C show an example of an interactive sports application. This interactive sports application may be executed when a user tunes to a channel showing a sporting event. That is, the interactive sports application may be incorporated as part of the tuning application for tuning to the channel. During the normal sports broadcast, a semi-transparent pop-up 802 may appear (e.g., at the lower left-hand corner of the screen 800) as shown in FIG. 8A. If the user presses "OK" on the remote control, the pop-up is cleared and the application tunes to another channel on which an event is about to occur. If the user presses "OK" again, the user is returned to the original channel. At any time during viewing of the sporting event, the user can press an "Info" button to display a semi-transparent statistics menu 804 as shown in FIG. 8B. This menu contains choices 806-1 to 806-4 for player statistics, score details, sports headlines, and scores from other games in the league, respectively. If one of the menu choices is selected, a semi-transparent statistics overlay 808 is displayed as shown in FIG. 8C. The user can scroll through the information, press an "Info" button on remote control 230 to return to the menu, or press "Exit" to clear the display of overlay 808.

Figure 9B:
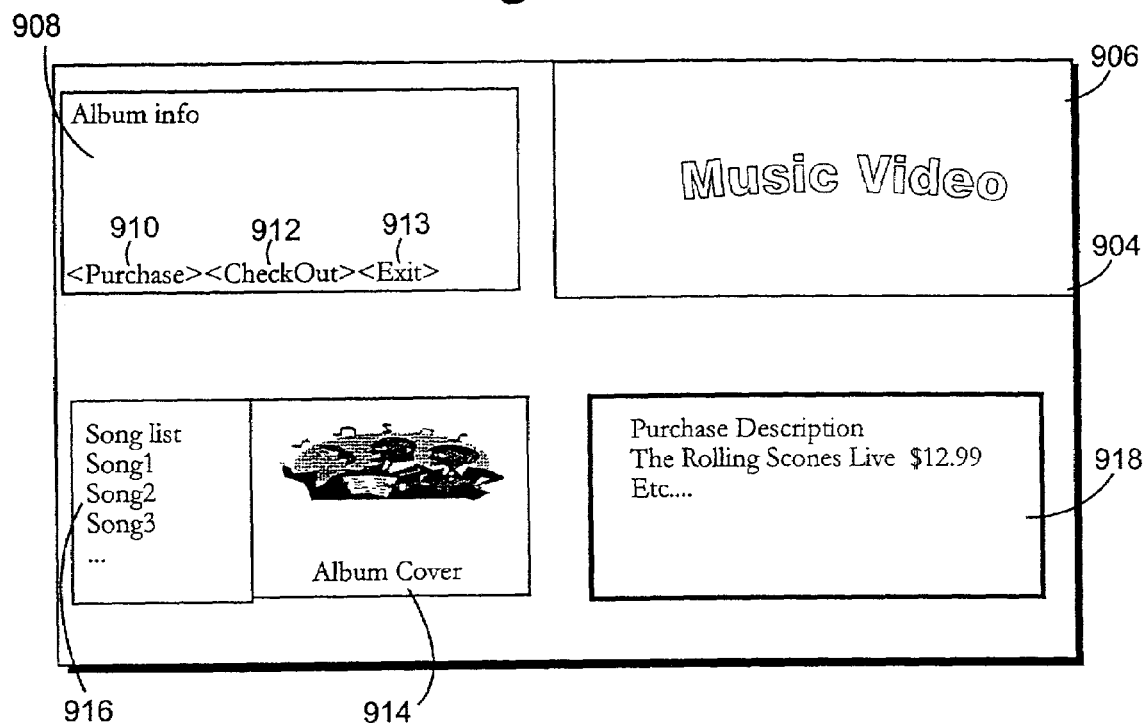
Figure 9C:
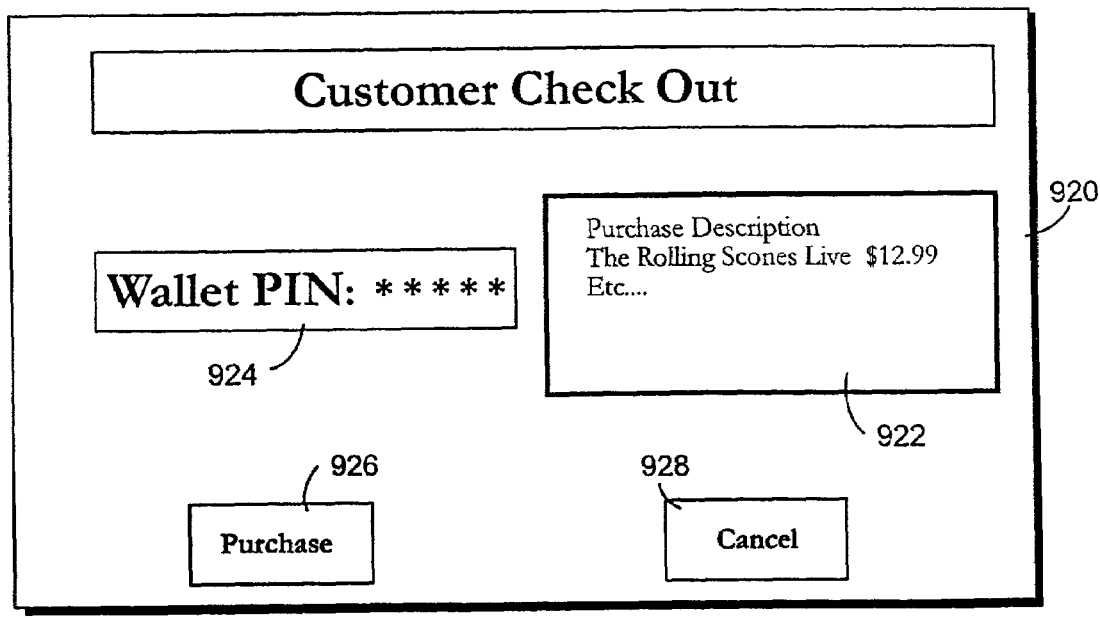

FIGS. 9A–C show an example CD purchase application. This application initially displays a music video on screen 900 with a small overlay button 902 ("Buy Me!") indicating that a related CD is available for sale. If the user selects button 902, a purchase screen 904 shown in FIG. 9B. In purchase screen 904, the music video is displayed in a window ("picture-in-graphic") 906 at the upper right-hand corner of screen 904. Purchase screen 904 includes an album information section 908 that provides album information and purchase, check out, and exit choices 910, 912, and 913 respectively. An image of the album cover is displayed in screen section 914 and a selection section 916 allows the user to select one of the songs (or some portion thereof) on the CD for listening. The audio may be looped or may be real-time playback using an on demand server at the head-end. A purchase information section 918 provides purchase information such as price. Selecting the purchase (or "Add to Cart") choice 910 lets the user add the corresponding CD to his/her shopping list and selecting the exit choice returns the user to viewing the full-screen video shown in FIG. 9A. Check out choice 912 allows the user to complete his/her purchase(s) via a Customer Check Out screen 920 shown in FIG. 9C. Check out screen 920 includes a purchase list section 922 that shows the user's complete purchase list. The purchase lists includes, for example, an identification of the purchased CD, the corresponding prices, a sub-total cost, any taxes, and a total cost. The user is prompted to enter a PIN code in field 924 (e.g., using numeric keys on remote control 25) and the transaction may be completed by selecting purchase button 926. Selecting cancel button 928 returns the user to the screen 900 shown in FIG. 9A.

Figure 10A:
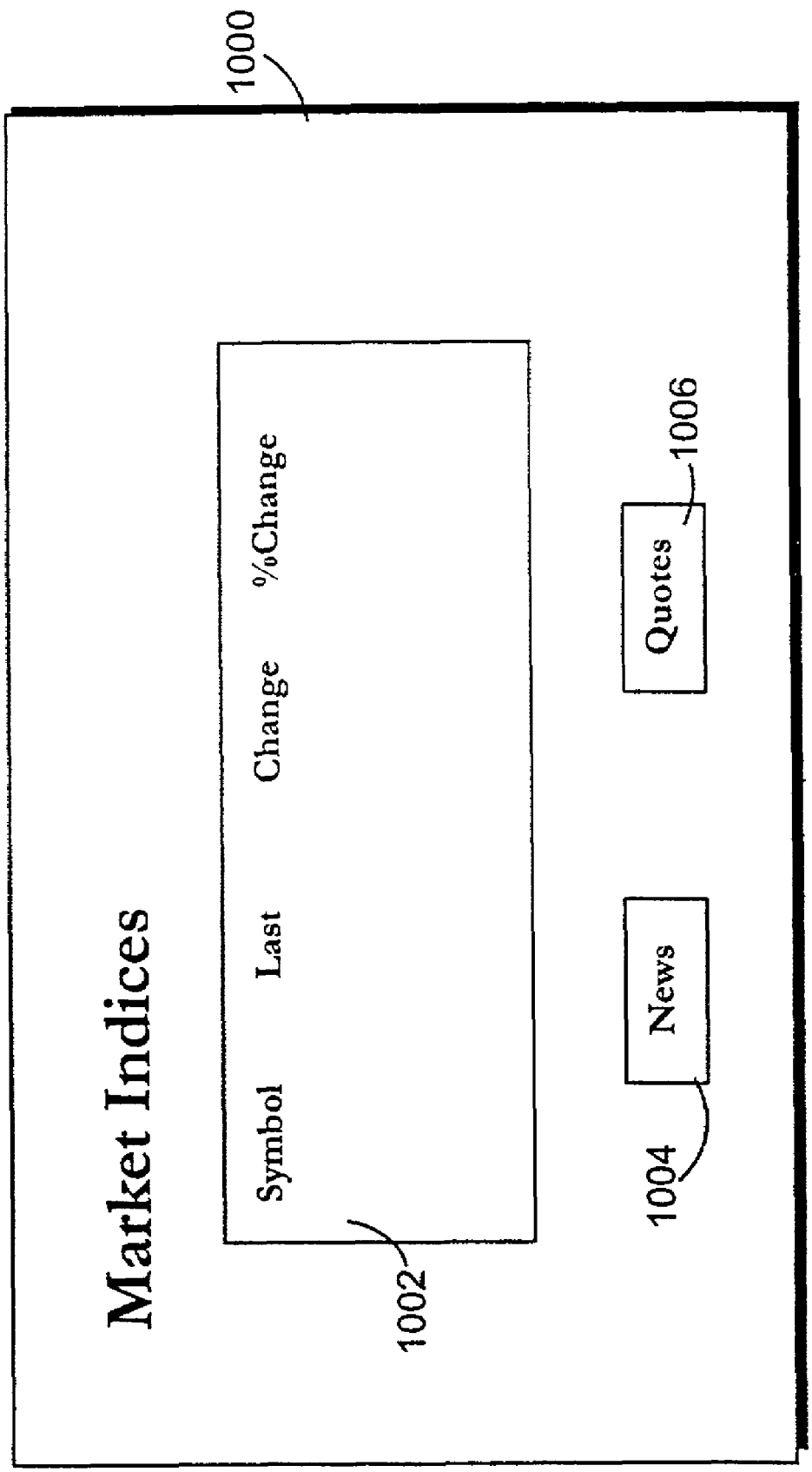
FIGS. 10A–D show an example stock ticker application.
Figure 10B:
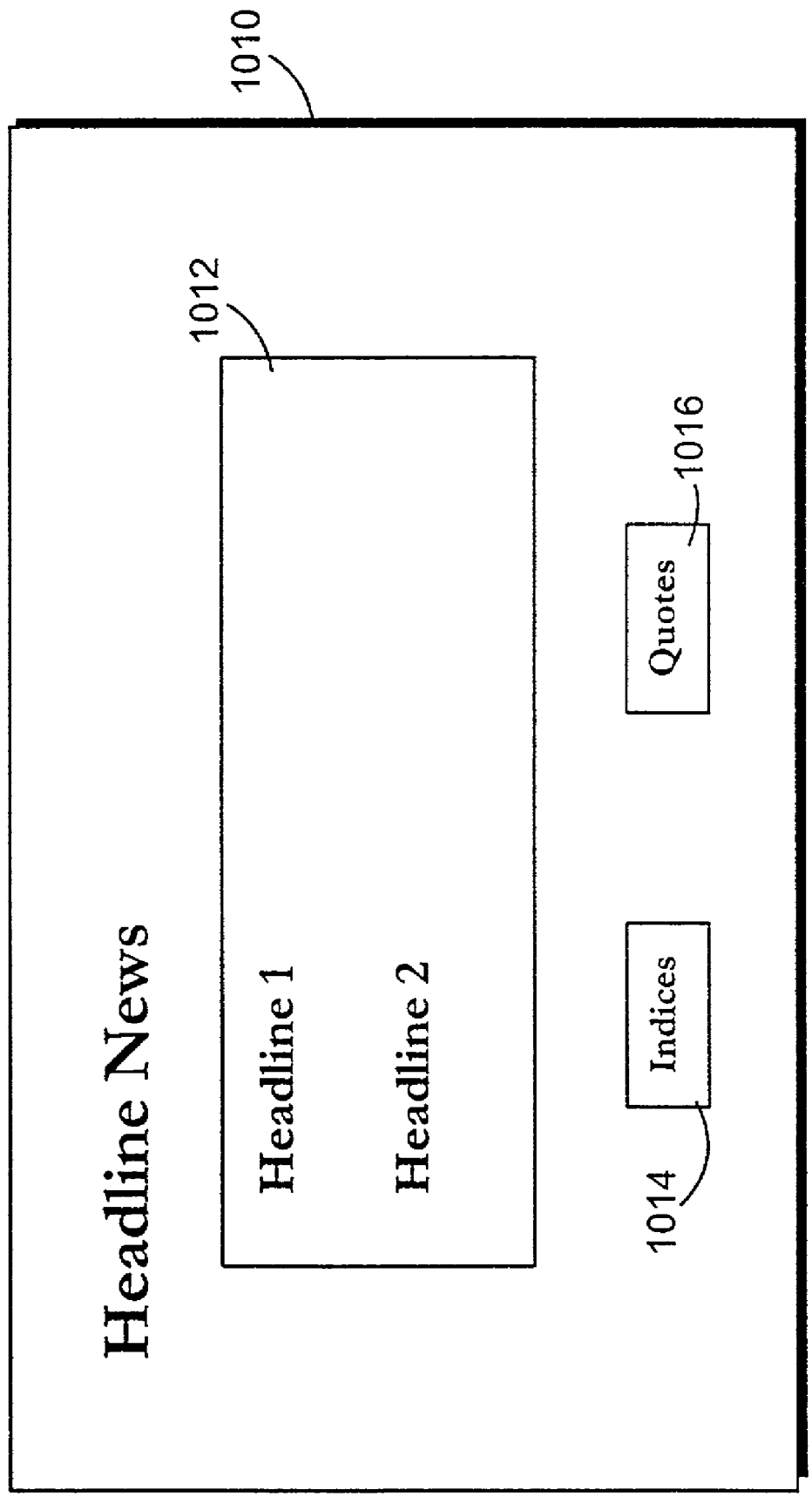
Figure 10C:
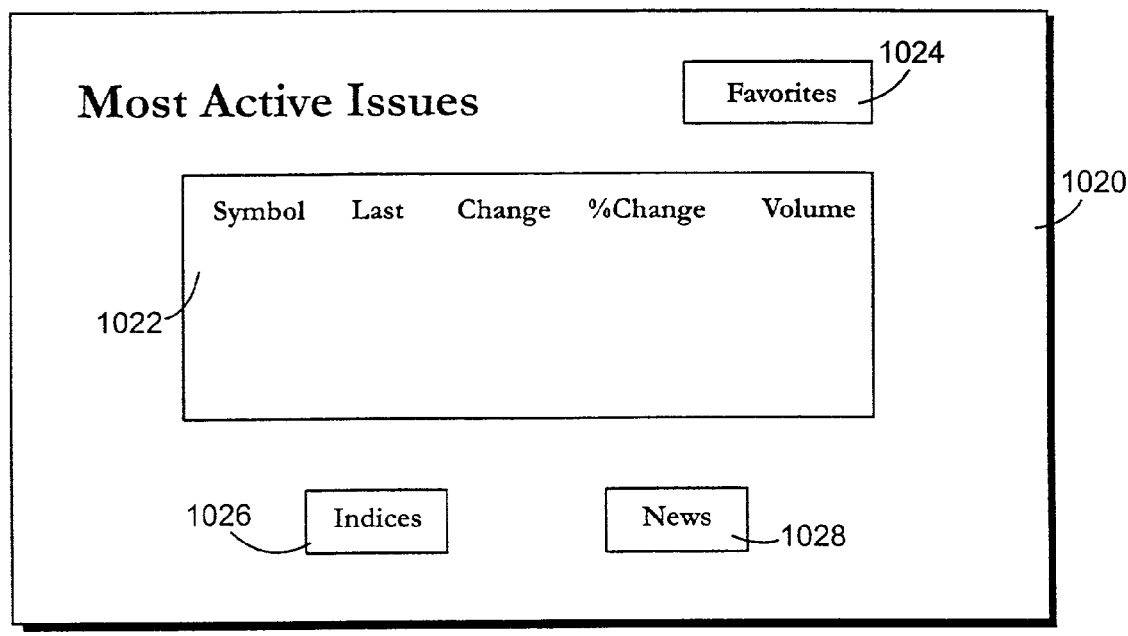
Figure 10D:
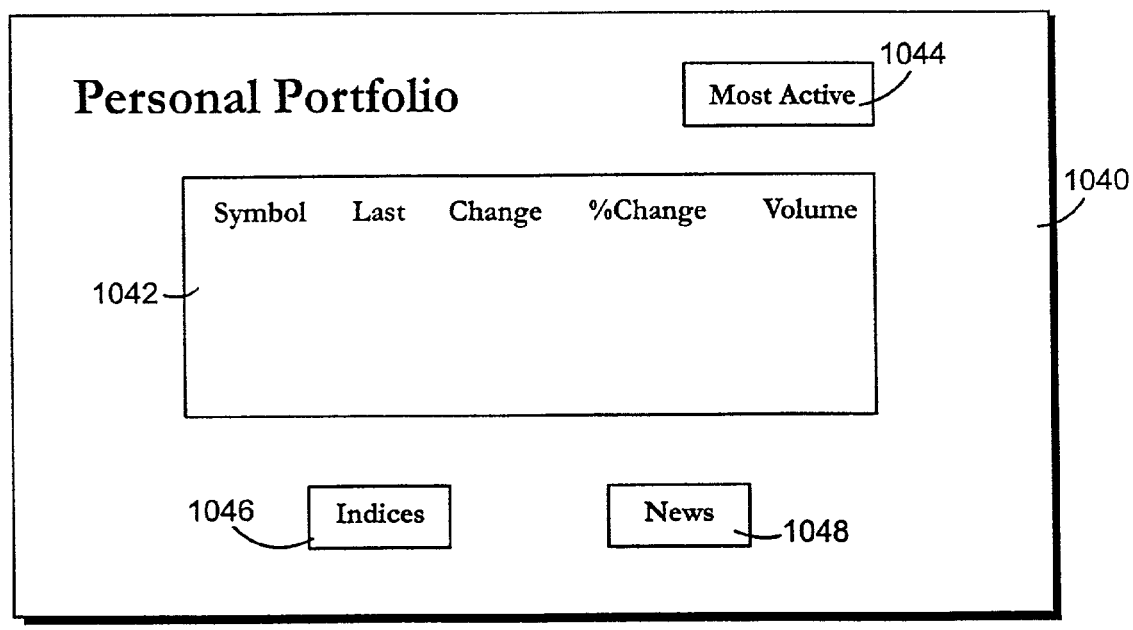

FIGS. 10A–D show an example stock ticker application. This application initially displays a market summary screen 1000 that provides a summary of major market indices in a table 1002 having columns for identifying the index (e.g., Dow Jones Industrial Average, Dow Jones Transports, Dow Jones Utilities, NASDAQ, S&P500, 30-YR Bonds, Oil & Gas); the value of the index; the change in the index relative to some baseline (e.g., its opening value on that day); and a percent change. Of course, the column fields and the arrangement of these column fields are provided by way of illustration, not limitation. For example, a logo could be provided for each index. The logo may be indicative of some entity (e.g., NYSE or NASDAQ) associated with the index or of a relevant commodity associated with the index (e.g., an oil can or a gas pump for the Oil & Gas index). Screen 1000 also includes a news button 1004 and a quotes button 1006. Pressing news button 1004 takes the user to a news screen 1010 shown in FIG. 10B. News screen 1010 includes a window 1012 that has a few short headline news stories. Window 1012 may be scrolling or non-scrolling. News screen 1010 also includes an indices button 1014 that returns the user to market summary screen 1000 shown in FIG. 10A and a quotes button 1016. Pressing the quotes button 1006 from screen 1000 or the quotes button from screen 1010 takes the user to "most active" quotes screen 1020 shown in FIG. 10C. The most active quotes screen 1020 includes a table 1022 having columns for identifying the stock symbol, the last quote, the change relative to some baseline (e.g., its opening quote on that day), the percent change, and the trading volume. Of course, the column fields and the arrangement of these column fields are provided by way of illustration, not limitation. For example, the table could also provide a company logo for each of the listed stocks. The user may toggle between the screen 1020 showing the most active stocks and a screen 1040 shown in FIG. 10D that lists the "favorite" stocks of that particular user. This toggling may be performed using "favorites" button 1024 in screen 1020 (FIG. 10C) and "most active" button 1044 in screen 1040 (FIG. 10D). The user may set up a personal portfolio by selecting stocks from a list of stocks (not shown) displayed on the user's television screen or by entering the stock symbol using an on-screen keyboard or a keyboard connected as an input device to STB 13. Screen 1020 also includes "indices" button 1026 for taking the user to screen 1000 shown in FIG. 10A and a "news" button for taking the user to screen 1010 shown in FIG. 10B. "Indices" button 1046 and "news" button 1048 of screen 1040 perform similar functions.

While the portals are described above in the context of a STB connected to a television, the present invention is not limited in this respect. Thus, the portals may be generated by circuitry incorporated in a television, VCR, PVR, DVD player or in computing devices such as personal computers and personal digital assistants.

Each of the documents listed above is incorporated herein by reference.

While particular embodiments of the present invention have been described and illustrated, it should be understood that the invention is not limited thereto because modifications may be made by persons skilled in the art. The present application contemplates any and all modifications that fall within the spirit and scope of the underlying invention discloses and claimed herein.

We claim:

1. A portal for a broadcast digital television system comprising a remote terminal connected via a communications network to a broadcast center, the portal comprising:

a display connected to the remote terminal for displaying a plurality of pages, wherein each page of the plurality of pages comprises an arrangement of cells, each cell comprising a visual object and an underlying application that is launched from behind each cell and is displayed upon user selection of each cell; and a user input device for selecting one cell of the arrangement of cells, wherein each page of the plurality of pages is dynamically reorganized based on a content of the arrangement of cells on each page, wherein a first cell of the arrangement of cells displays one of a plurality of programs received from the broadcast center, wherein a second cell of the arrangement of cells is sensitive to the context of the first cell displaying the one program, and wherein a third cell of the arrangement of cells is generated for a specific period of time corresponding to a length of at least one of the plurality of programs being displayed on another cell of the arrangement of cells.

2. The portal according to claim 1, wherein the cells include one or more dynamically changing cells.

3. A method of generating a portal for a communications system, comprising:

receiving a plurality of broadcast programs; and generating a portal comprising:

a plurality of pages configured to display a plurality of cells;

the plurality of cells containing live video of at least some of the received programs, wherein at least one cell of the plurality of cells comprises a visual object and an underlying application that is launched from behind the at least one cell and is displayed upon user selection of the at least one cell; and a first cell of the plurality of cells associated with an application whose function is dependent on the context of a second cell containing live video; and dynamically reorganizing at least one page of the plurality of pages based on a content associated with the plurality of cells on the at least one page, wherein a third cell of the arrangement of cells is generated for a specific period of time corresponding to a length of at least one of the plurality of broadcast programs being displayed on another cell of the plurality of cells.

* * * * *